United States Patent
Min et al.

(10) Patent No.: US 8,229,892 B2
(45) Date of Patent: Jul. 24, 2012

(54) STORAGE APPARATUS AND DATA RESTORING METHOD USED THEREIN

(75) Inventors: Zhongzhong Min, Kawasaki (JP); Yasuyuki Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 12/606,246

(22) Filed: Oct. 27, 2009

(65) Prior Publication Data
US 2010/0145915 A1    Jun. 10, 2010

(30) Foreign Application Priority Data

Dec. 9, 2008   (JP) .................................. 2008-312824

(51) Int. Cl.
*G06F 17/30* (2006.01)

(52) U.S. Cl. ................. 707/640; 707/999.203; 711/161; 711/162

(58) Field of Classification Search .................. None
See application file for complete search history.

(56) References Cited

U.S. PATENT DOCUMENTS

| | | | |
|---|---|---|---|
| 5,522,037 A | 5/1996 | Kitagawa et al. | |
| 6,658,434 B1 | 12/2003 | Watanabe et al. | |
| 7,111,026 B2 | 9/2006 | Sato | |
| 7,685,171 B1 * | 3/2010 | Beaverson et al. | 707/999.202 |
| 2006/0075200 A1 | 4/2006 | Satoyama et al. | |
| 2007/0083567 A1 | 4/2007 | Arai et al. | |

FOREIGN PATENT DOCUMENTS

| | | |
|---|---|---|
| JP | 7-84728 | 3/1995 |
| JP | 2001-216185 | 8/2001 |
| JP | 2005-235058 | 9/2005 |
| JP | 2006-107162 | 4/2006 |
| JP | 2007-102692 | 4/2007 |

OTHER PUBLICATIONS

Japanese Office Action for corresponding Japanese Application 2008-312824; issued Oct. 26, 2010.

* cited by examiner

*Primary Examiner* — Jean B Fleurantin
*Assistant Examiner* — Anteneh Girma
(74) *Attorney, Agent, or Firm* — Staas & Halsey LLP

(57) ABSTRACT

A storage apparatus includes a processor to control the apparatus according to a process including creating, in each of the management areas in response to the restore execution instruction from the host, update information that indicating whether the data in each of the management areas is updated from restore generation to be restored to the latest generation, on the basis of the backup information in each generation, extracting the data before update stored in the backup volume of the oldest generation as the data of the restore generation on the basis of the update information for the oldest generation in each of the management areas, and updating the current data stored in the same management areas as the management areas in which the data before update was stored, by the data before update extracted by the extracting process.

8 Claims, 20 Drawing Sheets

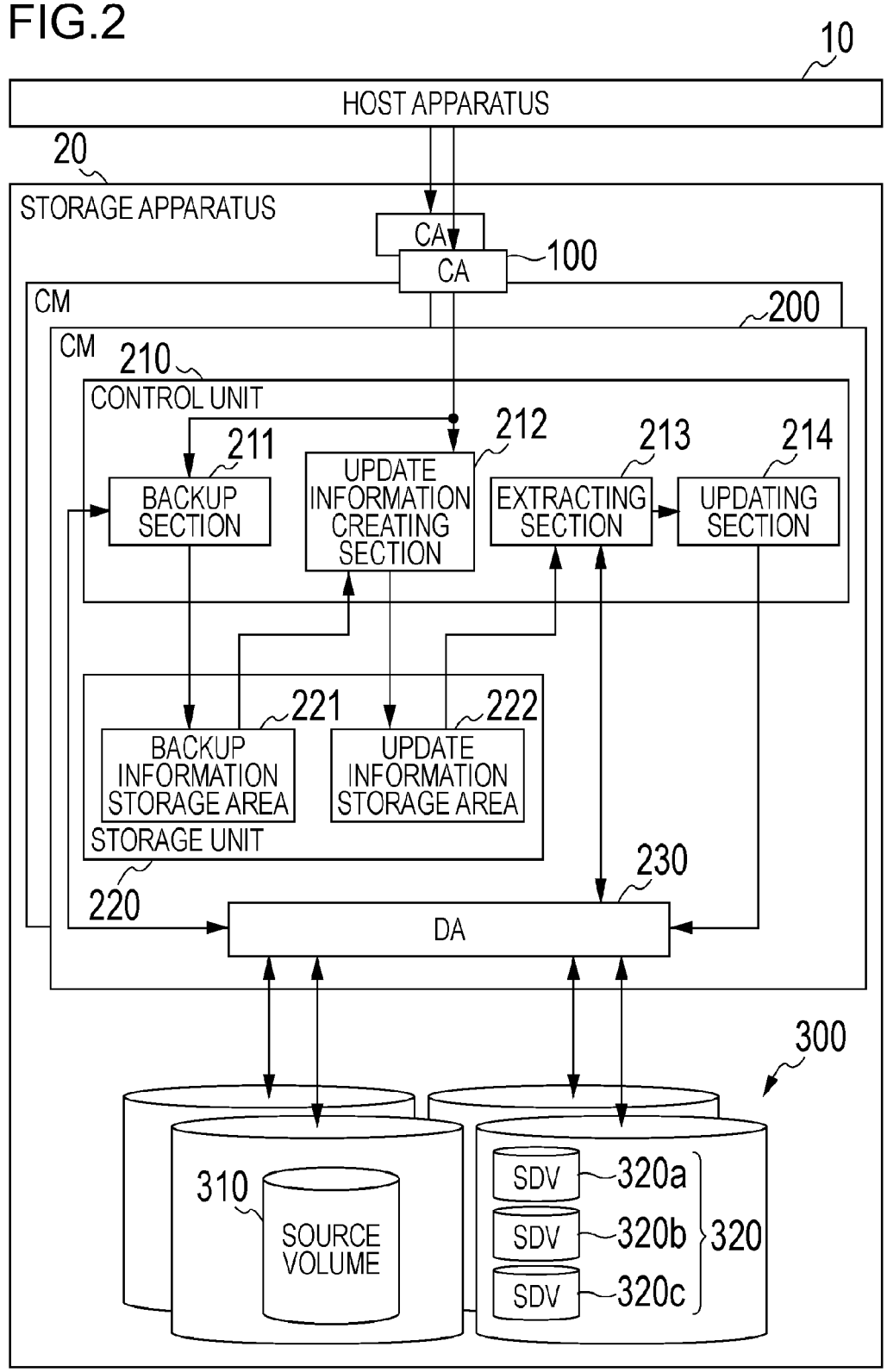

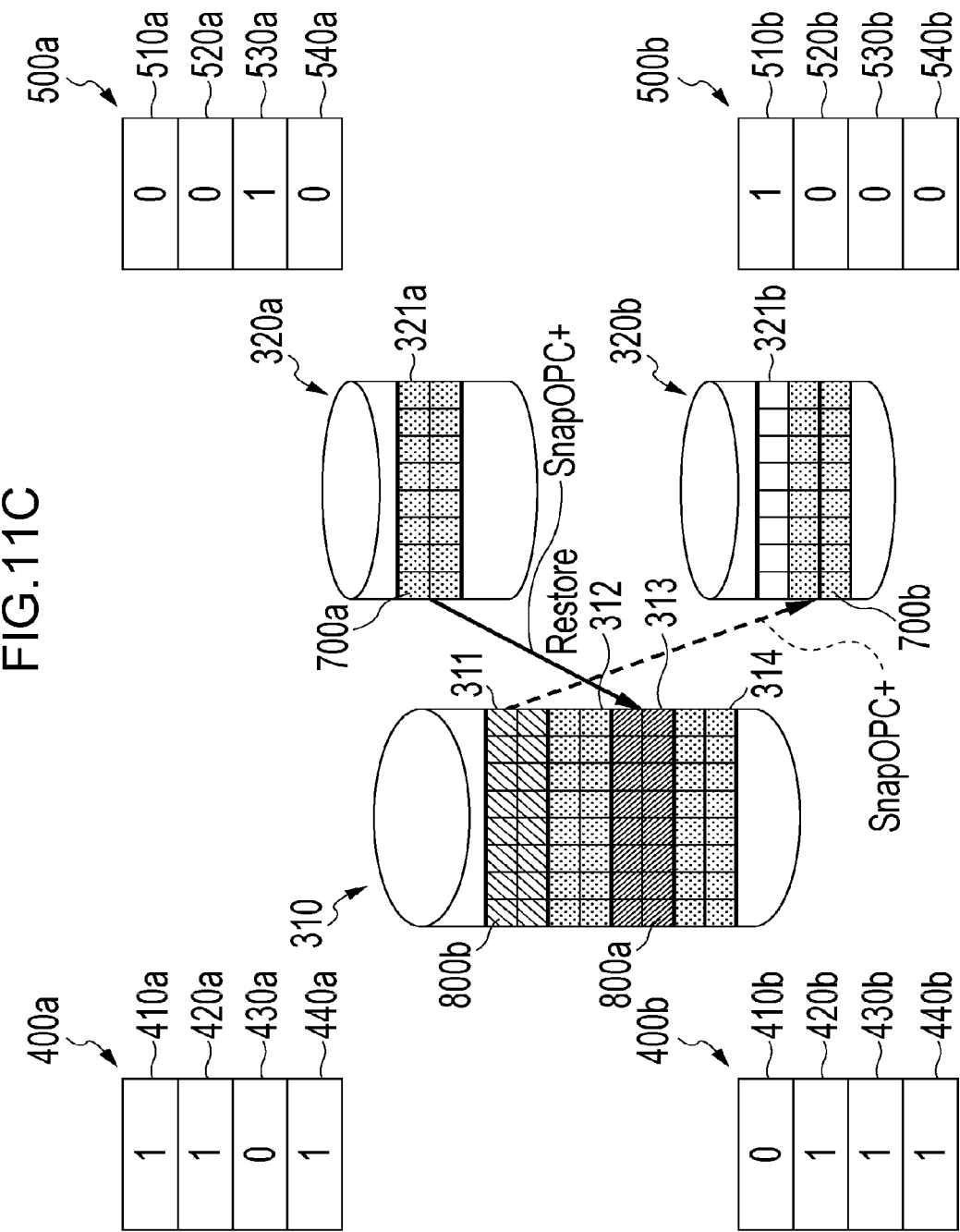

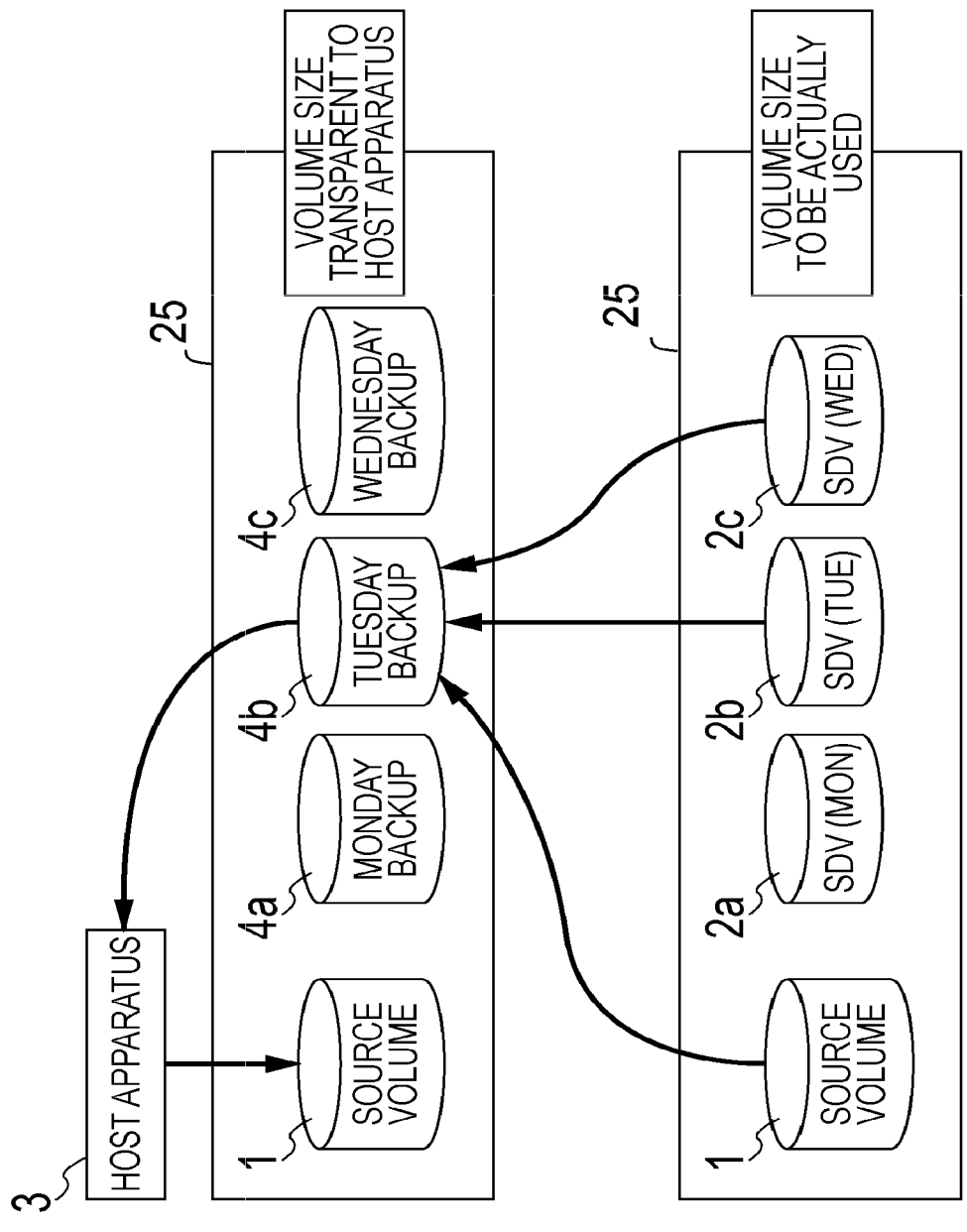

STORAGE APPARATUS AND DATA RESTORING METHOD USED THEREIN

CROSS-REFERENCE TO RELATED APPLICATIONS

This application is based upon and claims the benefit of priority of the prior Japanese Patent Application No. 2008-312824, filed on Dec. 9, 2008, the entire contents of which are incorporated herein by reference.

FIELD

The embodiments discussed herein are related to storage apparatus and method for restoring data.

BACKGROUND

Hitherto, SnapOPC (Snapshot One Point Copy) has been known as one of methods for backing up data in a storage apparatus. SnapOPC is a method that creates the backup of only an updated part of the data in a copy source volume in creating the backup data.

Furthermore, in recent years, as an extension function of SnapOPC, a method called SnapOPC+ that creates backup data for each generation has been proposed. More specifically, SnapOPC+ creates a Snap Data Volume (which will be called SDV hereinafter) which is a backup volume for each generation (such as for each day of the week) and copies the differential data between generations to the SDV.

For example, as illustrated in FIG. 19, a storage apparatus implementing SnapOPC+ creates Monday SDV 2a, Tuesday SDV 2b and Wednesday SDV 2c on Monday, Tuesday and Wednesday as backup volumes of a copy source volume 1. At that time, the Monday SDV 2a only stores the updated part of the data from Monday, and the Tuesday SDV 2b only stores the updated part of the data from Tuesday. The Wednesday SDV 2c only stores the updated part of the data from Wednesday.

By the way, in such a storage apparatus, in order to restore the current state of a copy source volume to a state of an arbitrary generation, a host apparatus 3, which connects to the storage apparatus 25, first instructs to execute the restoration, as illustrated in FIG. 20. Here, it is assumed that the instruction has been given for restoring the current state of the copy source to the Tuesday's state.

The storage apparatus 25 in response to the restore execution instruction recovers as the state of the data of Tuesday on the basis of the data (current data) stored in the copy source volume 1 and the differential data stored in the Tuesday SDV 2b and Wednesday SDV 2c. Then, the host apparatus 3 reads out the recovered data and updates the source volume with the read data. Thus, the current state of the copy source can be restored to the data as of Tuesday (refer to Japanese Laid-open Patent Publication No. 2006-107162, for example).

However, as illustrated in FIG. 20, the host apparatus 3 only recognizes that all data of a generation is stored in the corresponding backup volume of the generation, unlike its actual volume size. Therefore, when restoration is executed through the host apparatus 3, the processing of rewriting an updated part only is difficult to perform, and the data in the copy source is entirely rewritten as described above. This means that the part which has not been updated is also rewritten, which may possibly take unnecessary time for the restoration. Furthermore, the data reading processing and writing processing may task the host apparatus.

SUMMARY

According to an aspect of the invention, a storage apparatus includes a source volume for storing data being read and written by a host. The data is stored in each of management areas allocated to the source volume. The storage apparatus further includes a backup volume for backing up data before update in each of the management areas allocated to the source volume in each generation, and a processor to control the storage apparatus according to a process. The process includes backing up the data before update into the backup volume corresponding to current generation, upon the data of the source volume being updated from immediately preceding generation on the current generation, creating, in each of the management areas, backup information indicating whether the data is backed up, upon the data being backed up in each generation, receiving restore execution instruction from the host, creating, in each of the management areas in response to the restore execution instruction, update information that indicating whether the data in each of the management areas is updated from restore generation to be restored to the latest generation, on the basis of the backup information in each generation, extracting the data before update stored in the backup volume of the oldest generation as the data of the restore generation on the basis of the update information for the oldest generation in each of the management areas, and updating the current data stored in the same management areas as the management areas in which the data before update was stored, by the data before update extracted by the extracting process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a block diagram for describing a configuration of a storage apparatus according to first embodiment;

FIG. 11C is a diagram illustrating how data is restored to the Monday's state;

FIG. 20 is a diagram for describing a restoration method according to a related art.

DESCRIPTION OF EMBODIMENTS

With reference to attached drawings, embodiments of a storage apparatus, restoration method disclosed herein will be described in detail below.

First Embodiment

Figure 1:
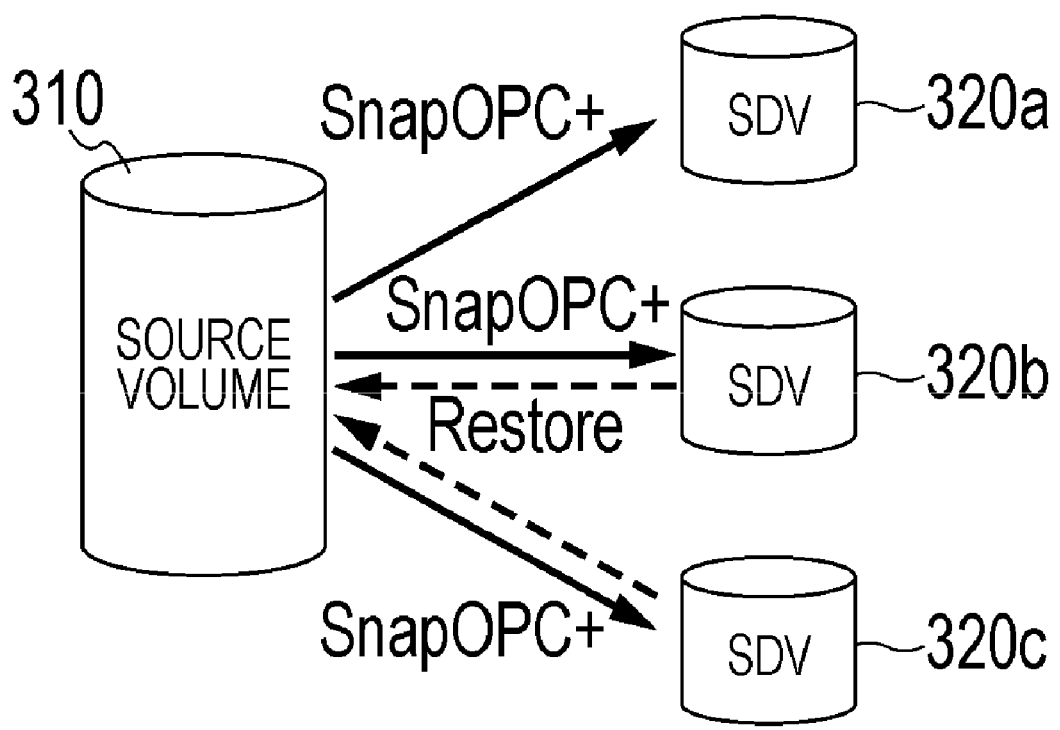
FIG. 1 is a diagram for describing outline of backup method and restoration method according to first embodiment.

First of all, the data backup method and restoration method according to this embodiment will be described with reference to drawings. FIG. 1 is a diagram for describing the outline of the backup method and restoration method according to the first embodiment.

The storage apparatus according to this embodiment implements SnapOPC+ that manages the generations of backup data on the basis of SnapOPC, as a data backup function. Here, SnapOPC is a method for only backing up an updated part in data in a copy source volume during the creation of a backup of the data.

For example, as illustrated in FIG. 1, when SnapOPC+ creates backups for days of the week for a source volume 310, which is a copy source volume, SDVs (Snap Data Volumes) 320a to 320c corresponding to the days of week (from Monday to Wednesday, for example) are created.

More specifically, in the data stored in the source volume 310, the storage apparatus as of Monday only copies the part updated from Monday as differential data and stores it to the Monday SDV 320a. In the same manner, the storage apparatus as of Tuesday only copies the part updated from Tuesday as differential data and stores it to the Tuesday SDV 320b. The storage apparatus as of Wednesday only copies the part updated from Wednesday as differential data and stores it to the Wednesday SDV 320c. Thus, the SDVs 320a to 320c store the updated parts from the previous generations as differential data in the data stored in the source volume 310.

Before SnapOPC+ starts the backup processing, the host apparatus defines generations (including defining the number of generations and a generation switching interval, for example). Then, the storage apparatus prepares the SDVs 320a to 320c for the generations in accordance with the generation definition. In FIG. 1, the number of generations are 3 (Monday to Wednesday), and the generation switching interval is one day.

Next, when SnapOPC+ starts the backup processing and the source volume 310 is updated (or written), the storage apparatus backs up the update data immediately to the first SDV 320 (which is the Monday SDV 320a here). Then, when the source volume 310 is updated next, the update data is subsequently backed up to Monday SDV 320a.

Then, after a lapse of the generation switching interval from the start of the backup processing, the storage apparatus automatically switches to the next SDV 320 (which is the Tuesday SDV 320b here) and continues the backup to the SDV 320b until the end of the generation switching interval. In this way, the storage apparatus switches the SDVs 320 at the generation switching intervals to perform the backup processing. Notably, at the end of the generation switching interval while the backup processing is still being performed on the last SDV 320 (which is the Wednesday SDV 320c here), the storage apparatus performs the backup processing on the first SDV 320.

In order to restore the state of the source volume 310 to the state of an arbitrary generation, the storage apparatus according to this embodiment performs the restore processing on the basis of the data stored in the SDVs 320 from the restore generation, which is the generation to be restored, to the latest generation. For example, in order to restore the state of the source volume 310 to the Tuesday' state on Wednesday, the storage apparatus performs the restore processing on the basis of the differential data stored in the SDV 320b for Tuesday and the differential data stored in the SDV 320c for Wednesday. Here, the storage apparatus according to this embodiment only rewrites the part updated from Tuesday in the data stored in the current (Wednesday's state) source volume 310. Thus, the time required for the restore processing can be optimized.

Next, an outline of the storage apparatus according to this embodiment will be described with reference to drawings. FIG. 2 is a block diagram for describing a configuration of the storage apparatus according to the first embodiment. Notably, according to this embodiment, the storage apparatus may be a hard disk apparatus. However, the storage apparatus according to this embodiment is not limited to a hard disk apparatus but may be other storage apparatus such as thermomagnetic disk apparatus and a semiconductor non-volatile memory.

As illustrated in FIG. 2, a storage apparatus 20 according to this embodiment includes a CA (Channel Adapter) 100, a CM (Centralized Module) 200 and a disk 300 and is connected to a host apparatus 10 through the CA 100.

The host apparatus 10 is an apparatus to be used by an operator and may correspond to, for example, a computer terminal to be used by a user of the storage apparatus 20 and transmits an execution instruction for backup or restoration to the storage apparatus 20 through the CA 100.

The CA 100 is an I/F control unit to/from the host apparatus 10 and controls the transmission/reception of information to/from the host apparatus 10. More specifically, the CA 100 may receive an execution instruction for backup or restoration from the host apparatus 10 or transmit the response to the instruction to the host apparatus 10. The CA 100 functions as receiving means for receiving a restore execution instruction on original data stored in the source volume 310 from the host apparatus 10.

The disk 300 is a storage medium that stores data regarding the backup processing or restore processing and particularly stores the source volume 310 and the SDVs 320a to 320c for days of the week. The source volume 310 is an operation volume from/to which data is read/written by the host apparatus 10. The SDV 320 is a backup volume that stores backup data in the source volume 310 for a day of the week.

The CM 200 is a processing section that performs the backup processing and restore processing, and has a control unit 210, a storage unit 220 and a DA (Disk Adapter) 230. Notably, the storage apparatus 20 includes one or more CMs 200, and each of the CMs 200 corresponds to one or more disks 300. Each of the CMs 200 performs processing on the SDV 320 stored in the corresponding disk 300.

The control unit 210 controls the operations by the corresponding CM 200 or CA 100 in the storage apparatus 20. The control unit 210 has a backup section 211, an update information creating section 212, an extracting section 213 and an updating section 214.

Figure 3A:
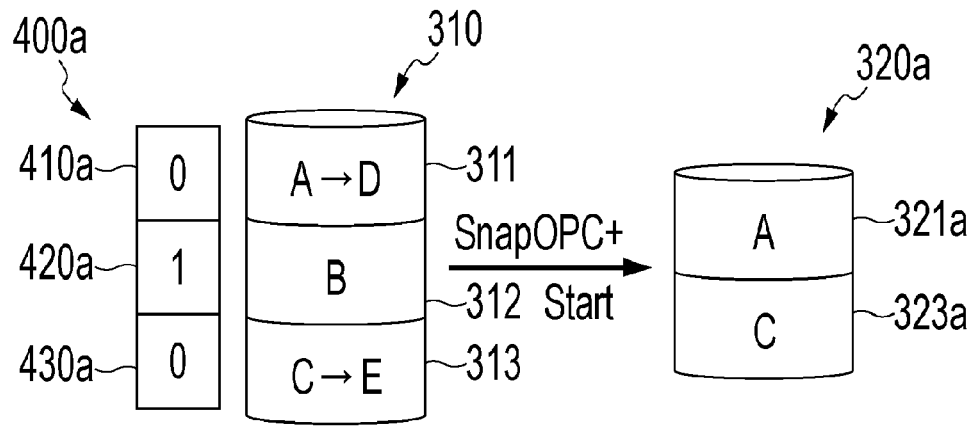
FIG. 3A is a diagram for describing how Monday SDV is created.
Figure 3B:
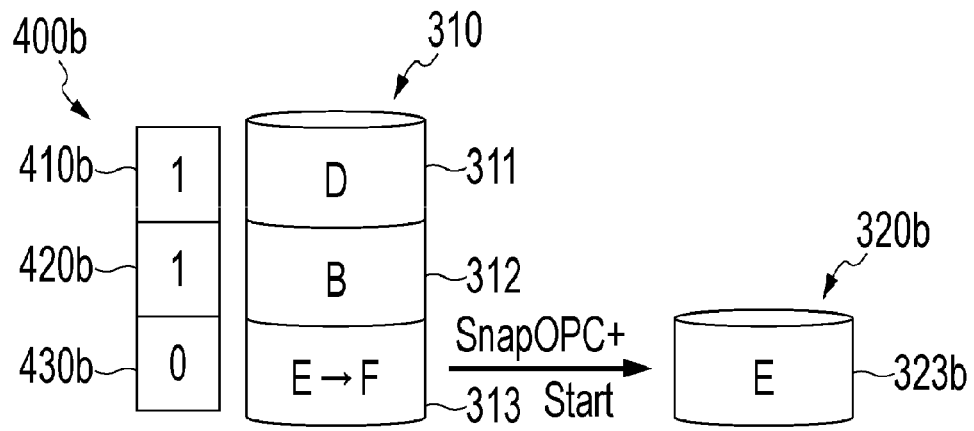
FIG. 3B is a diagram for describing how Tuesday SDV is created.
Figure 3C:
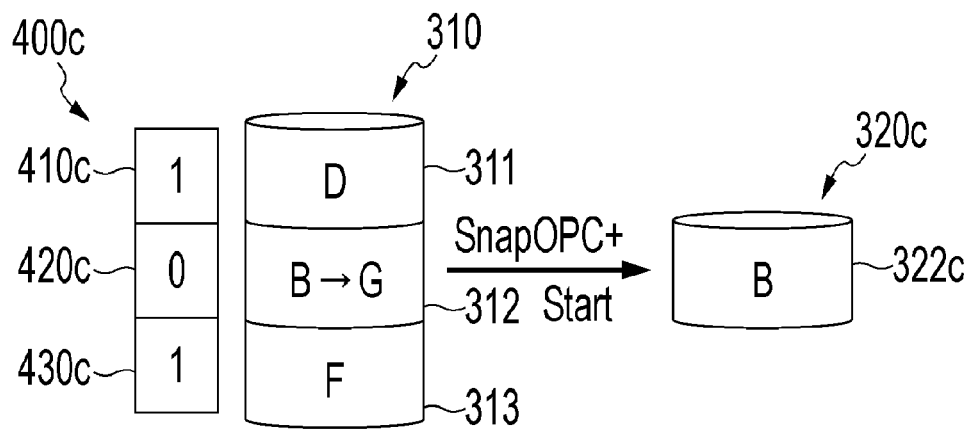
FIG. 3C is a diagram for describing how Wednesday SDV is created.

The backup section 211 functions as backup process and backs up the data before update in the updated part from the previous generation of the original data stored in the source volume 310 to the SDV 320 corresponding to the current generation. The backup section 211 further functions as backup information creating process and creates backup information describing whether original data has been backed up or not for each of plural management areas assigned to the source volume 310 of a backed up generation. The backup process and backup information creating process in the backup section 211 will be described in detail with reference to drawing below. FIG. 3A is a diagram for describing how Monday SDV is created, FIG. 3B is a diagram for describing how Tuesday SDV is created, and FIG. 3C is a diagram for describing how Wednesday SDV is created.

As illustrated in FIG. 3A, the source volume 310 is assigned three management areas 311 to 313, and the backup section 211 manages whether the original data has been backed up for each of the management area 311 to 313. For example, as illustrated in FIG. 3A, if data A in the management area 311 is updated to data D on Monday, the backup section 211 copies the data A, which is data before update, for the update and stores it in a predetermined area 321a in Monday SDV 320a. If data C in the management area 313 is updated to data E, the backup section 211 copies the data C for the update and stores it in a predetermined area 323a in the Monday SDV 320a.

As backup information for Monday, the backup section 211 further creates backup information 400a describing whether the original data stored in the source volume 310 has been copied or not for each of the management areas 311 to 313 on Monday. According to this embodiment, the backup information 400a is a bitmap indicating "0" if the data has been copied and indicating "1" if the data has not been copied, as illustrated in FIG. 3A.

More specifically, if the data A is updated to the data D, the backup section 211 changes the information in the area 410a, which corresponds to the management area 311 to which the data A belongs, in the backup information 400a to "0". In the same manner, if the data C is updated to data E, the backup section 211 changes the information in the area 430a, which corresponds to the management area 313 to which the data C belongs, in the backup information 400a to "0". On the other hand, because the data B which belongs to the management area 312 has not been updated, the information in the area 420a corresponding to the management area 312 in the backup information 400a to "1".

In the same manner, as illustrated in FIG. 3B, when the data E in the management area 313 is updated to the data F on Tuesday, the backup section 211 copies the data E before the update for the update and stores it in a predetermined area 323b in the Tuesday SDV 320b. The backup section 211 further changes, in the Tuesday backup information 400b, the value of the area 430b, which corresponds to the management area 313 where the data has been updated to "0" and the values in other areas 410b and 420b to "1".

In the same manner, as illustrated in FIG. 3C, when the data B in the management area 312 is updated to the data G on Tuesday, the backup section 211 copies the data B for the update and stores it in a predetermined area 323c in the Wednesday SDV 320c. The backup section 211 further changes, in the Wednesday backup information 400c, the value of the area 420c corresponding to the management area 312 where the data has been updated to "0" and the values in other areas 410c and 430c to "1". The thus created backup information pieces 400a to 400c are stored in the backup information storage area 221 in the storage unit 220 in association with the days of the week.

Notably, the storage apparatus 20 according to this embodiment performs the restore processing by handling the source volume 310 as a copy destination volume and the SDV 320 of the restore generation as a copy source volume to start OPC. Thus, the source volume 310 can not only be restored but also the current state of the source volume 310 can be backed up as the latest generation.

Figure 4A:
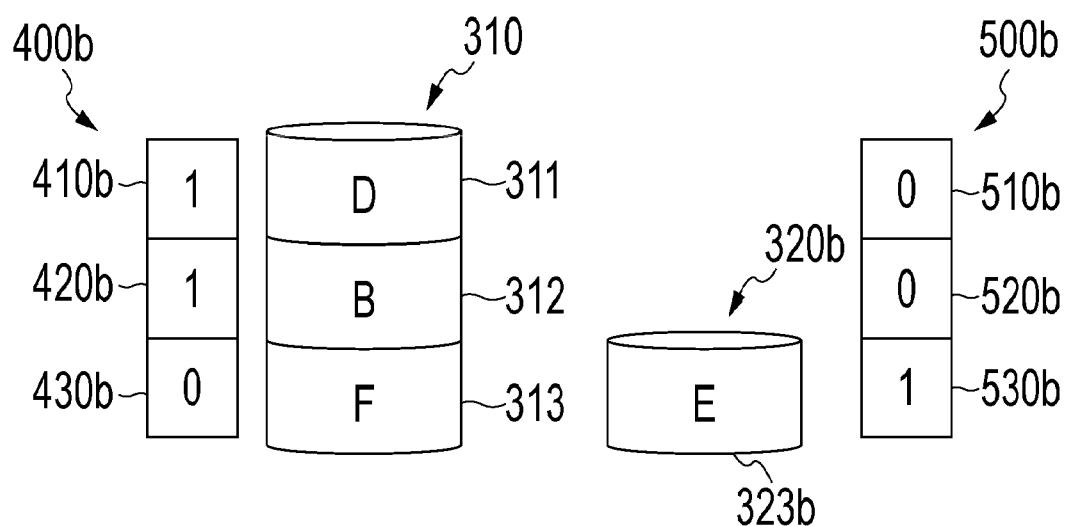
FIG. 4A is a diagram for describing how the bit map for Tuesday SDV is created.
Figure 4B:
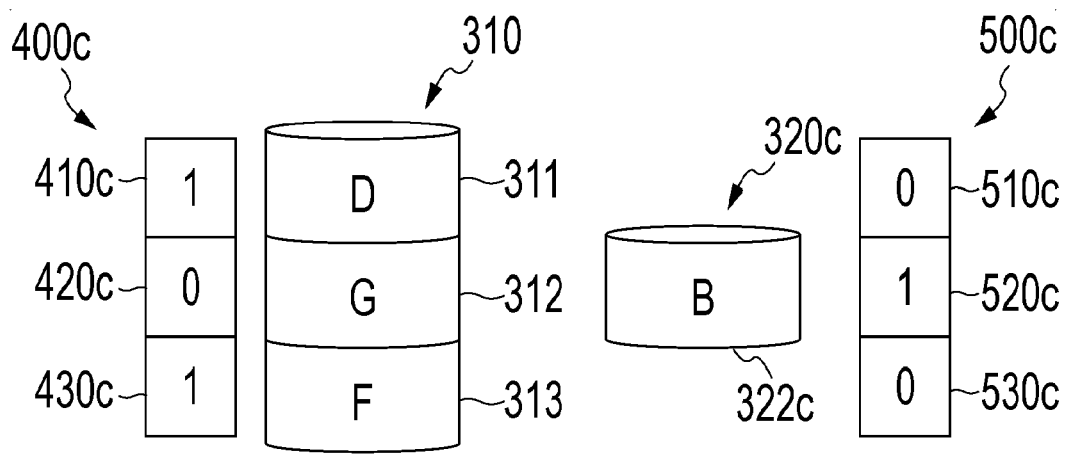
FIG. 4B is a diagram for describing how Wednesday SDV is created.

The update information creating section 212 functions as update information creating process and, in response to a restore execution instruction from the host apparatus 10, creates the update information, which describes whether the original data has been updated or not for each management area, on the basis of the backup information corresponding to the generations for the generations from the restore generation to the latest generation. The update information creating processing by the update information creating section 212 according to this embodiment will be described in detail with reference to drawings below. FIG. 4A is a diagram for describing how the bit map for Tuesday SDV is created and FIG. 4B is a diagram for describing how the bit map for Wednesday SDV is created. The case where the state of the source volume 310 is to be restored to the Tuesday' state when the SDVs 320a to 320c for Monday to Wednesday are created as illustrated in FIG. 3A to FIG. 3C will be described.

In order to restore the state of the source volume 310 to the Tuesday' state, the update information creating section 212 creates update information from Tuesday, which is the restore generation, to Wednesday, which is the latest generation, on the basis of the backup information pieces 400b, and 400c corresponding to the days of the week. At that time, the update information creating section 212 handles the values resulting from the inversion of the values of the backup information 400 as update information 500 for the days of the week.

For example, as illustrated in FIG. 4A, in order to create Tuesday's update information, the update information creating section 212 inverts the value "1" of the area 410b in the backup information 400b corresponding to the management area 311 and handles the value "0" as the value of the area 510b in the update information 500b corresponding to the management area 311. In the same manner, the update information creating section 212 inverts the value "1" and "0" of the areas 420b and 430b, respectively, in the backup information 400b corresponding to the management areas 312 and 313 and handles them as the values "0" and "1" of the areas 520*b* and 530*b* in the update information 500*b* corresponding to the management areas 312 and 313. In this way, in the update information 500, the "1" indicates that the data has been updated in the corresponding management areas 311 to 313 of the source volume 310, and the value "0" indicates that the data has not been updated.

As illustrated in FIG. 4B, in order to create Wednesday's update information, the update information creating section 212 inverts the value "1" of the area 410*c* in the backup information 400*c* corresponding to the management area 311 and handles the value "0" as the value of the area 510*c* in the update information 500*c* corresponding to the management area 311. In the same manner, the update information creating section 212 inverts the value "1" and "0" of the areas 420*c* and 430*c*, respectively, in the backup information 400*c* corresponding to the management areas 312 and 313 and handles them as the values of the areas 520*c* and 530*c* in the update information 500*c* corresponding to the management areas 312 and 313. The thus created update information pieces 500*a* to 500*c* are stored in the update information storage area 222 in the storage unit 220 in association with the days of the week.

Figure 5:
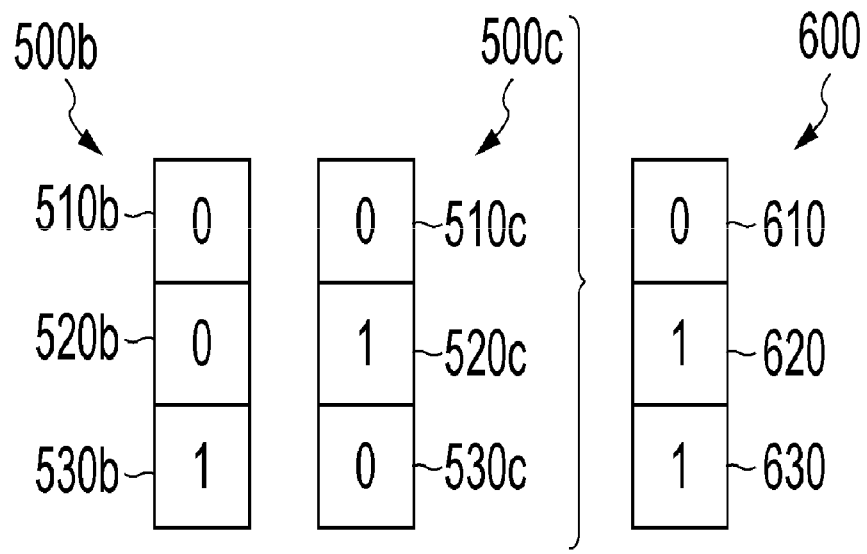
FIG. 5 is a diagram illustrating how the OR of update information of days of the week can be calculated.

The extracting section 213 functions as extracting process and extracts the differential data corresponding to the data of the restore generation from the differential data stored in the SDVs 320*b* and 320*c* of the generations for the management areas 311 to 313 in the source volume 310 on the basis of the update information 500*b* and 500*c* of the generations from the restore generation to the latest generation. The extracting processing by the extracting section 213 according to this embodiment will be described concretely with reference to drawings below. FIG. 5 is a diagram illustrating how the OR (logical add) of the update information of days of the week can be calculated.

As illustrated in FIG. 5, the extracting section 213 first calculates the OR of the values of the update information 500*b* and 500*c* of the generations from the restore generation to the latest generation. In other words, the extracting section 213 calculates the OR of the values "0" and "0" of the areas 510*b* and 510*c* in the update information pieces 500*b* and 500*c* corresponding to the management area 311 to acquire the value "0" of the area 610 corresponding to the management area 311 in the OR information 600. In the same manner, the extracting section 213 calculates the OR of the values "0" and "1" of the areas 520*b* and 520*c* in the update information pieces 500*b* and 500*c* corresponding to the management area 312 to acquire the value "1" of the area 620 corresponding to the management area 312 in the OR information 600. In the same manner the extracting section 213 calculates the OR of the values "1" and "0" of the areas 530*b* and 530*c* in the update information pieces 500*b* and 500*c* corresponding to the management area 313 to acquire the value "1" of the area 630 corresponding to the management area 313 in the OR information 600.

Next, on Tuesday, the extracting section 213 extracts the data (differential data) stored in the source volume 310 from the SDV 320 in accordance with the values of the areas 610 to 630 in the OR information 600. More specifically, the OR "0" as in the area 610 in the OR information 600 indicates that the data in the management area 311 has not been updated in the generations from the restore generation to the latest generation. Therefore, the extracting section 213 does not extract the data corresponding to the area 610 if the OR is "0".

On the other hand, if the OR is "1 as in the areas 620 and 630 in the OR information 600, the extracting section 213 identifies the data (differential data) stored in the source volume 310 on Tuesday from the values in the update information 500*b* and 500*c*. More specifically, the extracting section 213 checks the update information pieces 500*b* and 500*c* in order from the oldest generation. For example, in order to perform processing on the area 620 in the OR information 600 (for identifying the differential data stored in the management area 312), the extracting section 213 first checks the area 520*b* of the update information 500*b* for Tuesday, which is the oldest generation.

At that time, the value in the area 520*b* is "0", which indicates that the data has not been updated within the management area 312 in the source volume 310 corresponding to the area 520*b* on Tuesday. Accordingly, the extracting section 213 checks the area 520*c* in the update information 500*c* for Wednesday, which is the next oldest generation. At that time, the value of the area 520*c* is "1", which indicates that the data has been updated within the management area 312 corresponding to the area 520*c* on Wednesday. Therefore, the extracting section 213 extracts the differential data B corresponding to the area 520*c* from the SDV 320*c*.

In the same manner, in order to perform processing on the area 630 in the OR information 600 (for identifying the differential data stored in the management area 313), the extracting section 213 first checks the area 530*b* in the update information 500*b* for Tuesday, which is the oldest generation.

Here, the value of the area 530*b* in the update information 500*b* for Tuesday is "1", which indicates that the data has been updated in the management area 313 in the source volume 310 corresponding to the area 530*b* on Tuesday. Accordingly, the extracting section 213 extracts the differential data E corresponding to the area 530*b* from the SDV 320*b*. Notably, because it is determined that Tuesday SDV 320*b* stores the data (differential data) stored in the management area 313, no processing is performed on the area 530*c* in the update information 500*c* for Wednesday.

In this way, if the value of an area in the OR information 600 is "0" (that is, if the data in the management area in the source volume 310 corresponding to the area has not been updated), the extracting section 213 does not perform processing on the management area. If the value of an area in the OR information 600 is "1" (that is, if the data has not been updated in the management area in the source volume 310 corresponding to the area), the extracting section 213 checks the value of the area in the update information 500 corresponding to the management area. Then, the extracting section 213 determines the one having the value "1" and being the oldest generation in the update information 500 corresponding to the management area as the update information 500 of the generation which is the restore generation the data of which has been stored and extracts the corresponding differential data from the SDV 320 of the generation. At that time, because the extracting section 213 checks the value of the area in the update information 500 sequentially from the update information 500 of the older generations in the update information 500 from the restore generation to the latest generation, the extracting section 213 can perform the extracting processing efficiently.

According to this embodiment, as described above, the OR of the update information 500 from the restore generation to the latest generation is calculated, whereby the management area in which the data has not been updated in the management areas 311 to 313 in the source volume 310 is identified. The management area in which the data has not been updated does not require checking the value in the area of the corresponding update information. Therefore, the calculation of the OR can further optimize the time required for the restore processing. However, the calculation of the OR is not typically required.

The updating section 214 functions as updating process and uses the differential data extracted by the extracting section 213 to update the data currently stored in the management areas 311 to 313 in the source volume 310 where the differential data has been stored. More specifically, the updating section 214 uses the data B extracted from the Wednesday SDV 320c to update the data G currently stored in the management area 312. The updating section 214 further uses the data E extracted from the Tuesday SDV 320b to update the data F currently stored in the management area 313. The source volume 310 updates only the updated data G and F in the currently stored data D, G and F with the differential data B and E and is stored to the Tuesday' state (where data D, B and E are stored).

The storage unit 220 stores a control program such as an OS (Operating System) and programs defining the processing routines for backup and restore and required data. Particularly, the storage unit 220 includes a backup information storage area 221, which is an area for storing backup information, and an update information storage area 222, which is an area for storing update information.

The DA 230 is an I/F control unit with the disk 300 and may be used for storing differential data to the SDV 320 or extracting the differential data from the SDV 320 in the disk 300.

Figure 6:
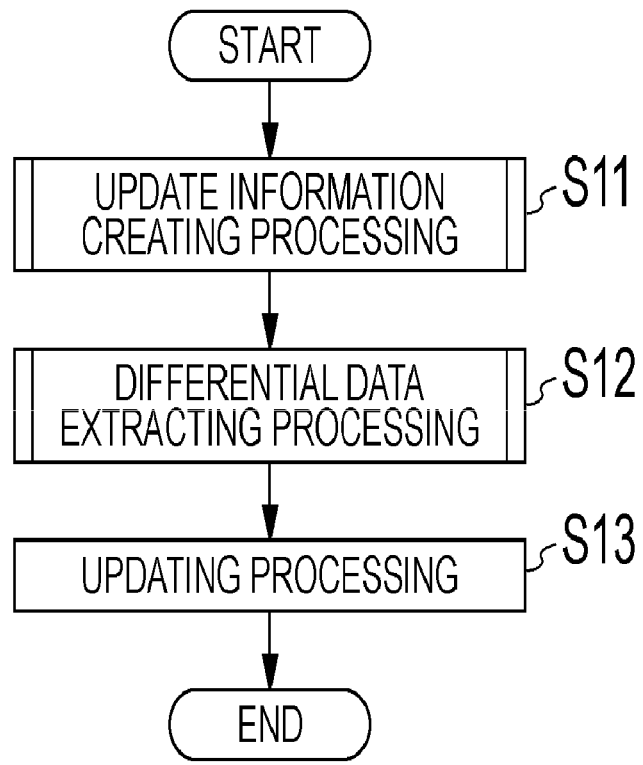
FIG. 6 is a flowchart illustrating an example of processing steps of restore processing by the storage apparatus according to first embodiment.

Next, concrete operations by the storage apparatus 20 according to this embodiment will be described in detail with reference to drawings. FIG. 6 is a flowchart illustrating an example of processing steps of the restore processing by the storage apparatus 20 according to the first embodiment. FIG. 6 only illustrates the processing steps relating to the restore processing on the source volume 310 in the processing steps to be performed by the storage apparatus 20.

When the control unit 210 in the storage apparatus 20 receives a restore execution instruction from the host apparatus 10 through the CA 100, the control unit 210, as illustrated in FIG. 6, first performs update information creating processing (step S11). The update information creating processing is processing for creating update information corresponding to the generations from the restore generation to the latest generation on the basis of the backup information of the generations. The processing is the processing from steps S21 to S24 in FIG. 7, which will be described later. Notably, the restore execution instruction includes information that designates the generation (restore generation) to be restored.

Next, the control unit 210 performs differential data extracting processing (step S12). The differential data extracting processing is processing of extracting the differential data corresponding to the data of the restore generation from the differential data stored in the SDVs 320 of the generations for the management areas 311 to 313 in the source volume 310 on the basis of the update information of the generations from the restore generation to the latest generation. The processing is processing from steps S31 to S37 in FIG. 8, which will be described later.

Next, the control unit 210 in the updating processing uses the differential data extracted by the differential data extracting processing in step S12 to update the data currently stored in the management area in the source volume 310 where the differential data has been stored (step S13). Upon completion of the processing, the control unit 210 ends the processing relating to the restore processing.

Figure 7:
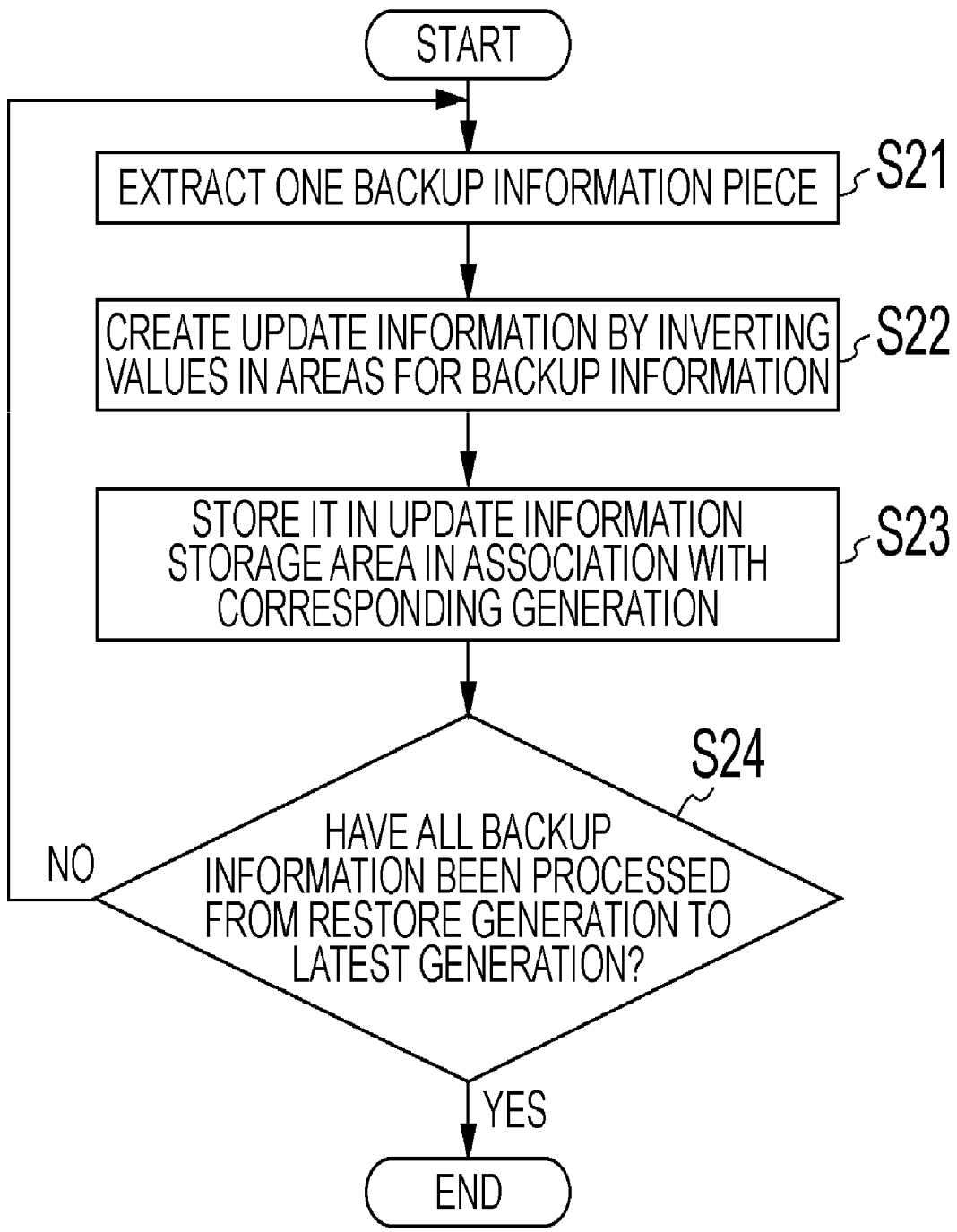
FIG. 7 is a flowchart illustrating an example of processing steps of update information creating processing by the storage apparatus according to first embodiment.

Next, the update information creating processing in step S11 will be described with reference to FIG. 7. FIG. 7 is a flowchart illustrating an example of processing steps of the update information creating processing by the storage apparatus 20 according to the first embodiment.

As illustrated in FIG. 7, when the update information creating processing starts, the update information creating section 212 extracts one backup information piece 400 from the backup information 400 of the generations from the restore generation to the latest generation (step S21). Next, the update information creating section 212 inverts the values of the areas 410 to 430 in the extracted backup information 400 to create the update information 500 (step S22) and stores the created update information 500 in the update information storage area 222 in the storage unit 220 in association with the corresponding generation (step S23).

After the processing in step S23 ends, the update information creating section 212 determines whether the processing has been performed on all of the backup information 400 from the restore generation to the latest generation or not (step S24). In the processing, if not all of the backup information 400 has been processed (No in step S24), the update information creating section 212 moves the processing to step S21. On the other hand, if it is determined that all of the backup information 400 has been processed (Yes in step S24), the update information creating section 212 ends the update information creating processing.

Figure 8:
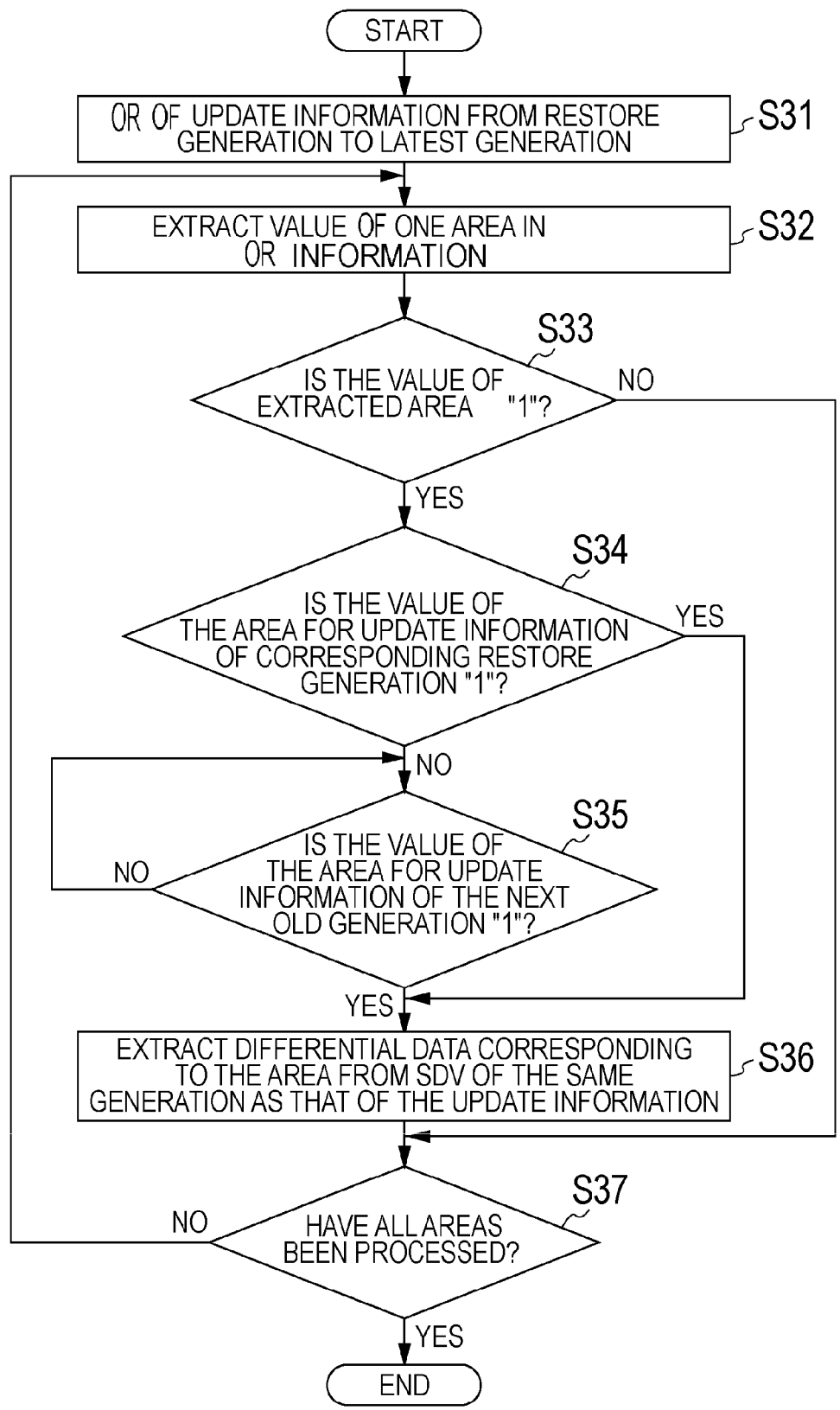
FIG. 8 is a flowchart illustrating an example of processing steps of differential data extracting processing by the storage apparatus according to first embodiment.

Next, the differential data extracting processing in step S12 will be described with reference to FIG. 8. FIG. 8 is a flowchart illustrating an example of processing steps of the differential data extracting processing by the storage apparatus 20 according to the first embodiment.

As illustrated in FIG. 8, when the differential data extracting processing starts, the extracting section 213 calculates the OR of the update information 500 from the restore generation to the latest generation (step S31). Next, the extracting section 213 extracts the value of one area from plural areas 610 to 630 in the OR information 600 created by the processing in step S31 (step S32). Next, the extracting section 213 determines whether the value of the area, which is extracted in step S32, is "1" or not (step S33). If it is determined in the processing that the value is "1" (Yes in step S33), the extracting section 213 moves the processing to step S34.

In step S34, the extracting section 213 determines whether the value of the area in the update information 500 of the restore generation corresponding to the area extracted in step S32 is "1" or not. If it is determined that the value of the area in the update information 500 of the corresponding restore generation is not "1" (No in step S34), the extracting section 213 moves the processing to step S35.

In step S35, the extracting section 213 determines whether the value of the corresponding area in the update information 500 of the next oldest generation is "1" or not. If the value of the corresponding area in the update information 500 of the next oldest generation is not "1" in the processing (No in step S35), the extracting section 213 performs the processing in step S35 again. On the other hand, if it is determined in step S35 that value of the corresponding area in the update information 500 of the next oldest generation is "1" (Yes in step S35) or if it is determined in step S34 that the corresponding value of the area in the update information 500 of the restore generation is "1" (Yes in step S34), the extracting section 213 moves the processing to step S36. In other words, the extracting section 213 checks in order from an older generation the area in the update information 500 corresponding to the area extracted in step S32 to identify the SDV 320 storing the differential data of the restore generation.

In step S36, the extracting section 213 extracts the differential data corresponding to the area for update information 500 from the SDV 320 of the same generation as that of update information 500, which is determined in step S34 or step S 35. After the completion of the processing in step S36 or if it is determined in step S33 that the value of the area extracted in step S32 is not "1" (No in step S33), the extracting section 213 determines whether the processing has been performed on all of the areas 610 to 630 in the OR information 600 or not. If it is determined in the processing that the processing has not been performed on all of the areas 610 to 630 in the OR information 600 (No in step S37), the extracting section 213 moves the processing to step S32. On the other hand, if it is determined that the processing has been performed on all of the areas 610 to 630 in the OR information 600 (No in step S37), the extracting section 213 ends the differential data extracting processing.

As described above, with the storage apparatus 20 and restoration method according to the first embodiment, the replacement of only the part updated in the source volume 310 by the data of the restore generation can optimize the time required for the restoration. Furthermore, because the restore processing can be performed only within the storage apparatus 20, without through the host apparatus, the amount of load on the host apparatus 10 can be reduced.

Second Embodiment

Figure 9:
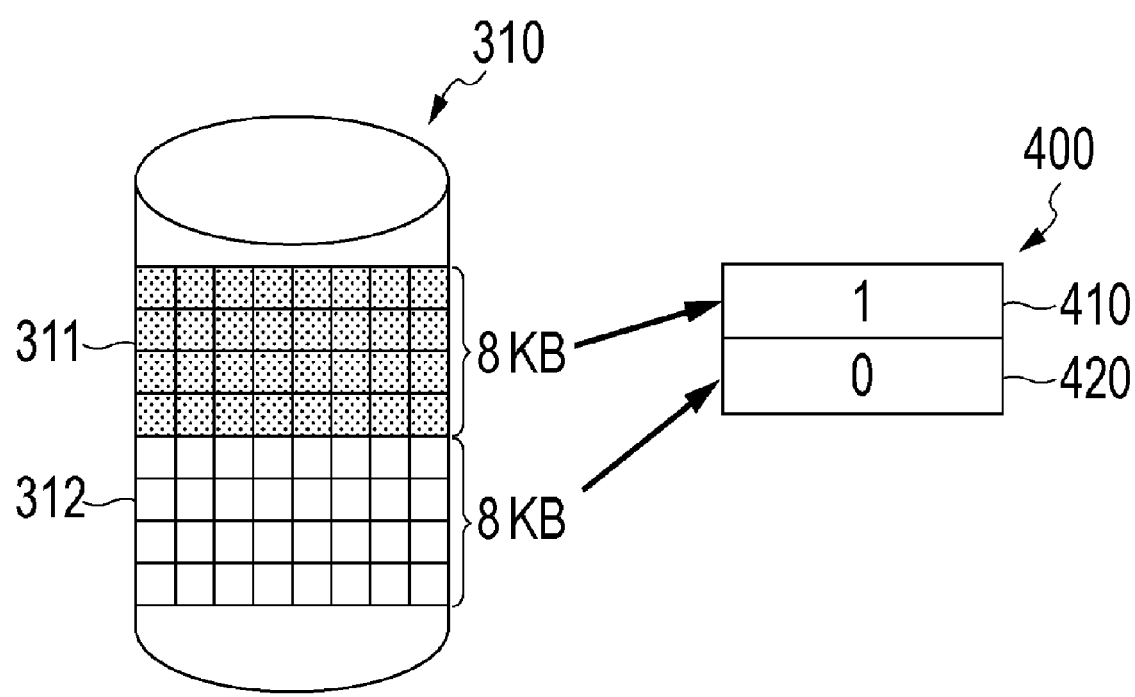
FIG. 9 is a diagram illustrating how copy status of 8-KB data is managed in 1 bit.

In order to manage whether the data stored in the source volume 310 by bitmap like the backup information 400 has been backed up not, the management of the copy status of 1-byte data in 1 bit greatly increases the volume of the bits to be managed, which may compresses the disk capacity. Accordingly, the storage apparatus 20 according to the first embodiment assigns the source volume 310 with 8-KB management areas to manage the copy status of the 8-KB disk capacity with 1 bit in bitmap, as illustrated in FIG. 9.

However, in the management of the copy status of a certain amount of disk capacity in 1 bit, as described above, differential data is stored in the SDV 320 off the beginning of the area of the SDV 320 corresponding to the management areas 311 to 313 in the source volume 310. If the restore processing with the differential data is performed under the state, the restored source volume 310 may have the omission of copy, which may not possibly result in the normal restoration. Accordingly, according to this embodiment, such omission of copy can be prevented.

Figure 10:
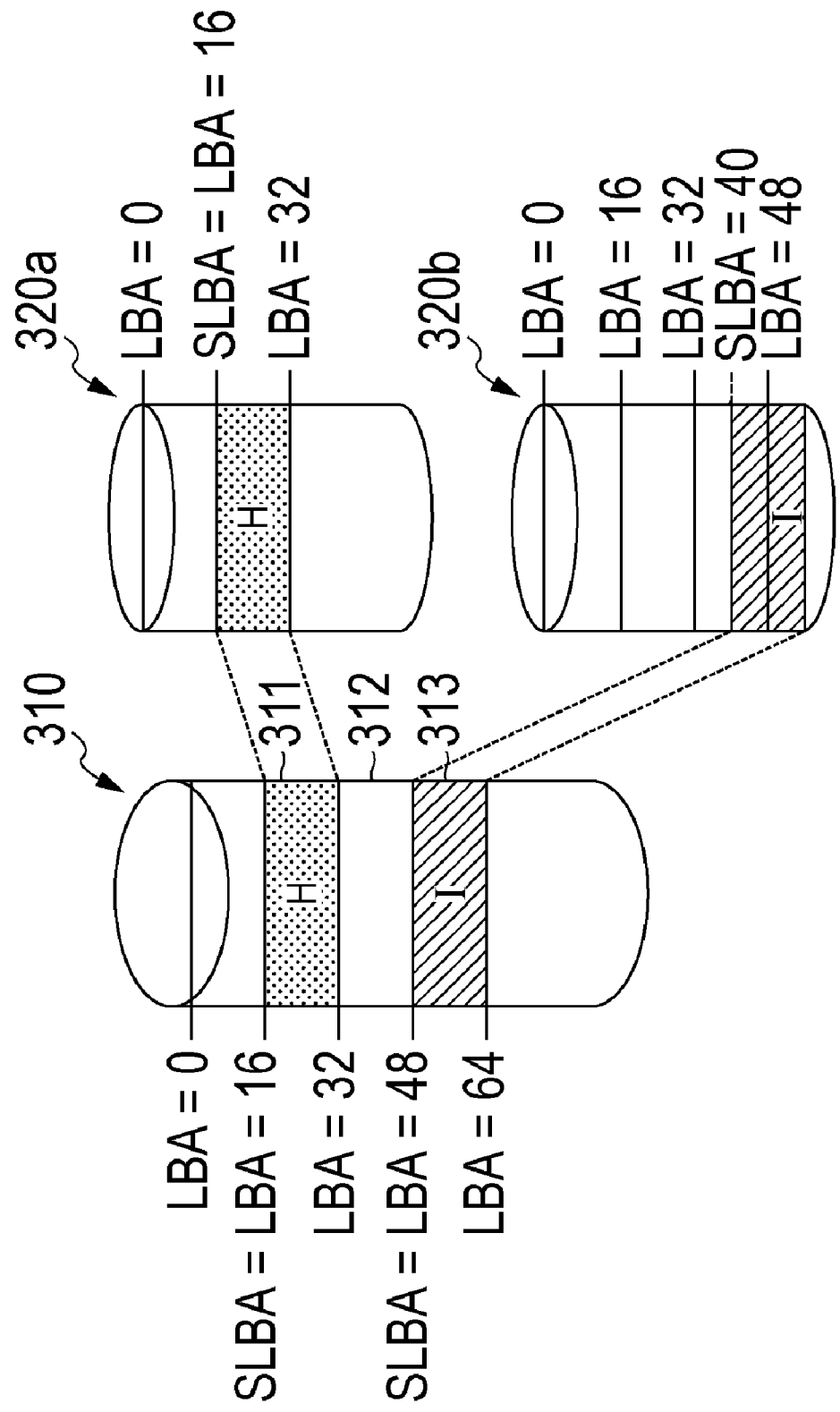
FIG. 10 is a diagram illustrating a state that starting address of a session is off the beginning of an LBA.

First of all, a case where the restored source volume 310 has omission of copy will be described concretely with reference to a drawing. FIG. 10 is a diagram illustrating a state that the starting address of a session is off the beginning of an LBA.

As illustrated in FIG. 10, a source volume 310 is assigned an LBA (Logical Block Address) representing an address in the source volume 310. The SDV 320 for a day of the week is also assigned an LBA representing an address in the source volume 310. An 8-KB capacity is equivalent to 16 LBAs, and a storage apparatus 20 manages the copy status of the data in the source volume 310 in groups of 16 LBAs on the basis of the backup information 400.

It is assumed here that, on Monday, data H stored in the management area 311 from LBA=16 to LBA=32 in the source volume 310 has been updated, and the data H is stored in a Monday SDV 320a as differential data. In this case, as illustrated in FIG. 10, when the differential data H is stored from the position at LBA=16 in the SDV 320a, an SLBA (Start Logical Block Address), which is the starting position of the session of restore processing in the management area 311 agrees with the beginning position (LBA=16) of the area in the SDV 320a. Therefore, in this case, even when the restore processing is performed by using the differential data H, the restored source volume 310 does not have omission of copy.

On the other hand, it is assumed that, on Tuesday, data I stored in the management area 313 from an LBA=48 to an LBA=64 in the source volume 310 has been updated and the data I is stored in a Tuesday SDV 320b as differential data. In this case, as illustrated in FIG. 10, the starting position of the session for the differential data 1 is an SLBA=40, and the differential data I is stored off the beginning position (LBA=32) of the area in the SDV 320b corresponding to the management area 313. In this case, when the restore processing is performed by using the differential data I, the data in the part off the area from an LBA=32 to an LBA=48 in the SDV 320b is not restored in the source volume 310, resulting in the omission of copy.

Figure 11A:
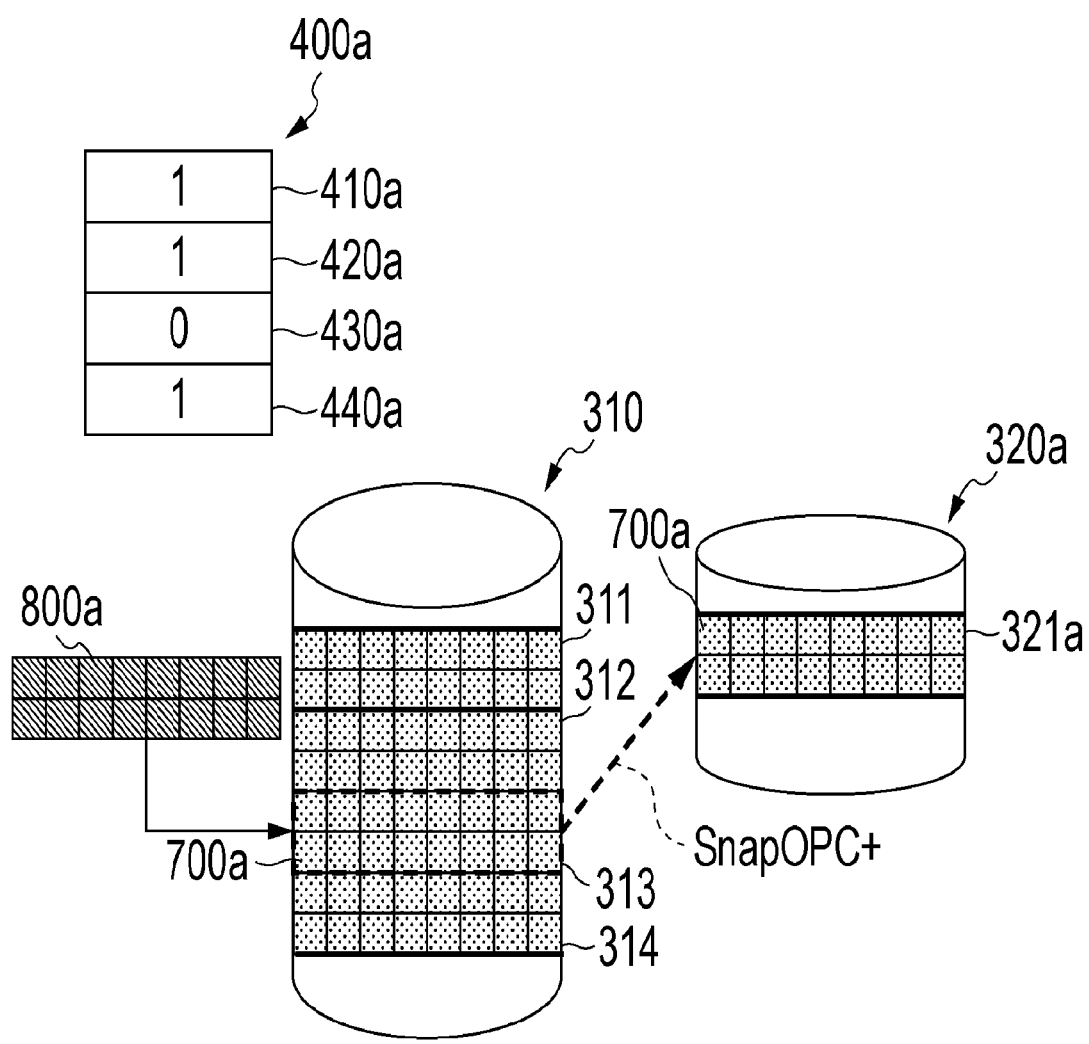
FIG. 11A is a diagram for describing how a Monday SDV is created.
Figure 11B:
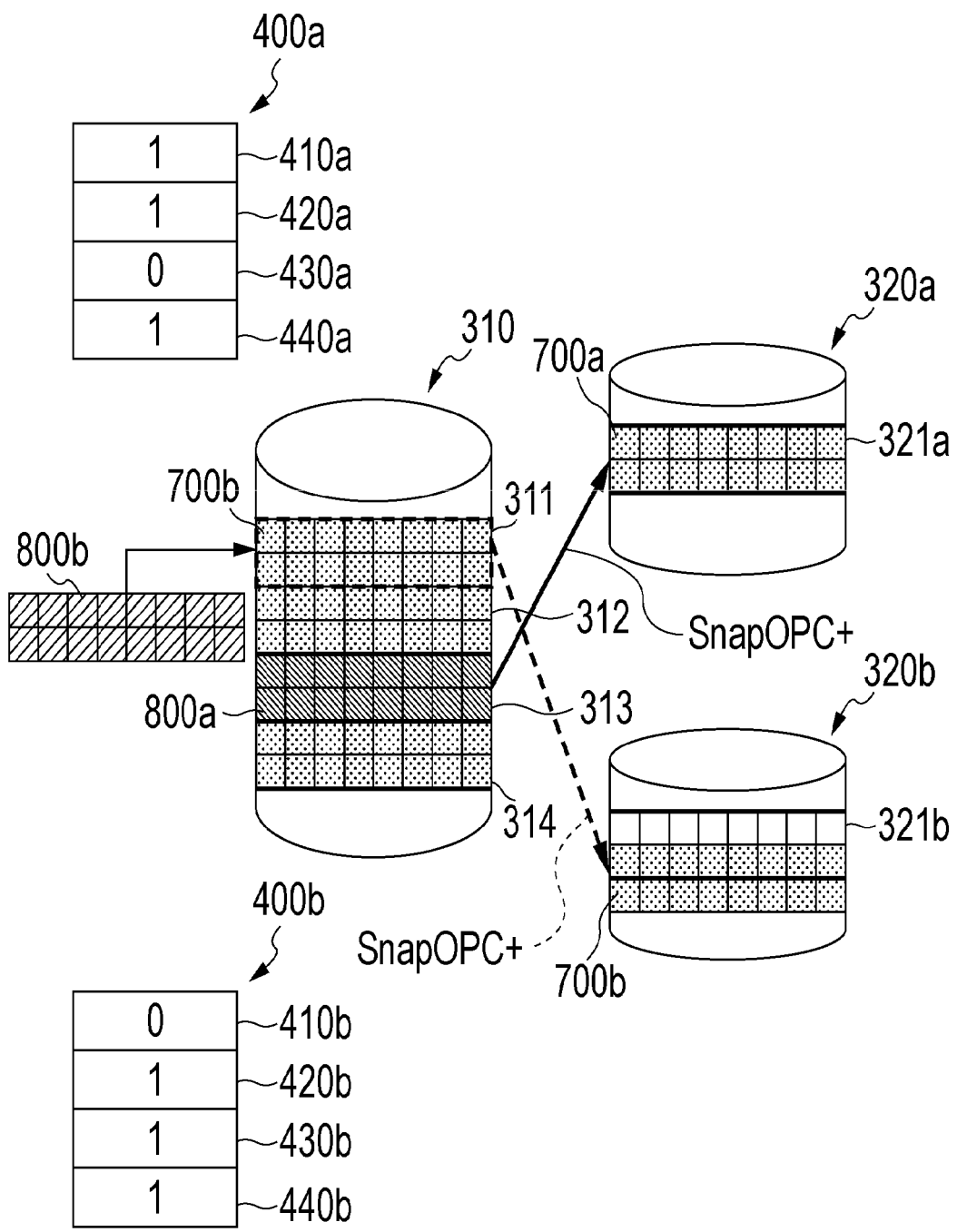
FIG. 11B is a diagram for describing how a Tuesday SDV is created.
Figure 12A:
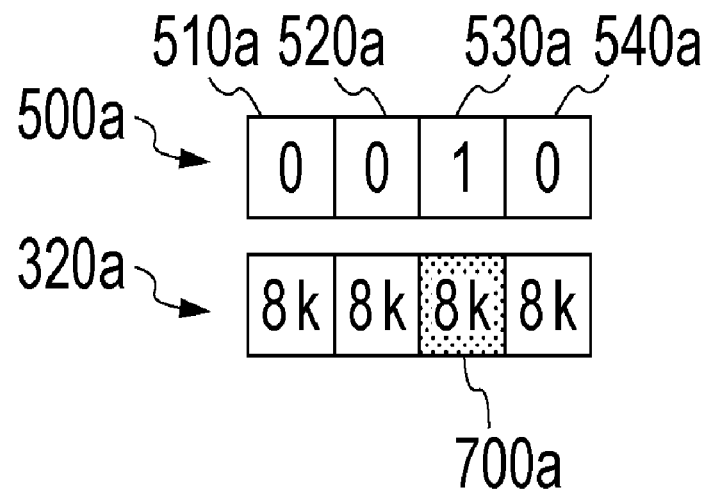
FIG. 12A is a diagram for describing the correspondence relationship between differential data stored in a Monday SDV and update information.
Figure 12B:
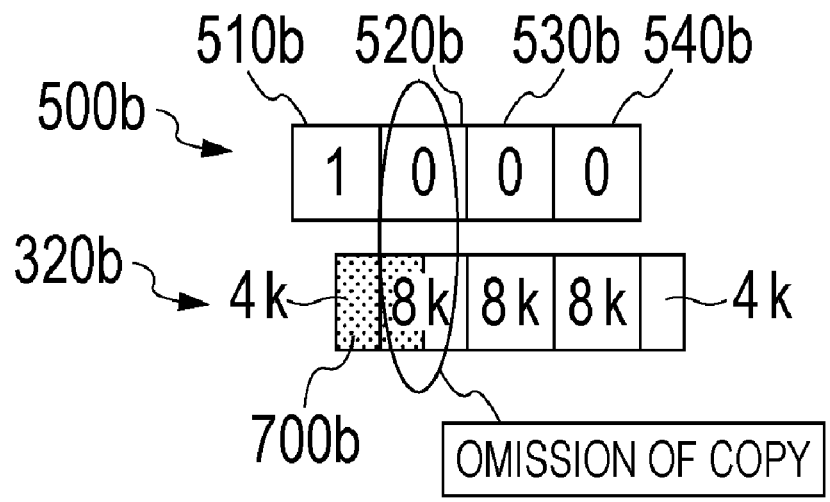
FIG. 12B is a diagram for describing the correspondence relationship between differential data stored in a Tuesday SDV and update information.
Figure 13:
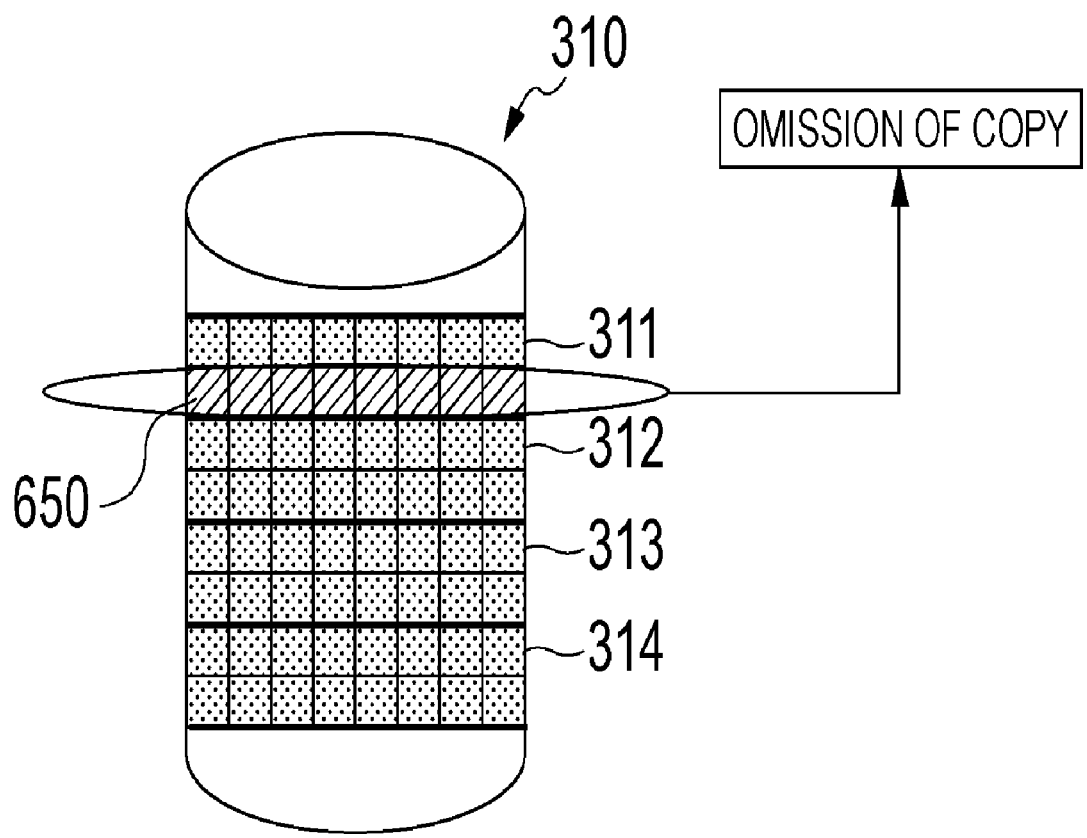
FIG. 13 is a diagram for describing a restored source volume has omission of copy.

The case where the restored source volume 310 has omission of copy will be described more concretely below. FIG. 11A is a diagram for describing how a Monday SDV is created, FIG. 11B is a diagram for describing how a Tuesday SDV is created, and FIG. 11C is a diagram illustrating how data is restored to the Monday's state. FIG. 12A is a diagram for describing the correspondence relationship between differential data stored in a Monday SDV and update information, and FIG. 12B is a diagram for describing the correspondence relationship between differential data stored in a Tuesday SDV and update information. FIG. 13 is a diagram for describing a restored source volume has omission of copy.

As illustrated in FIG. 11A, it is assumed that the source volume 310 is assigned four management areas 311 to 314, and data 700a stored in the management area 313 has been updated to data 800a on Monday. In this case, a backup section 211 in the storage apparatus 20 stores the differential data 700a in the area 321a in the Monday SDV 320a corresponding to the management area 313 in the source volume 310. Notably, the backup information 400a at that time has "0" as the value of the area 430a corresponding to the management area 313 and has "1" as the values in the other areas 410a, 420a and 440a.

As illustrated in FIG. 11B, when data 700b stored in the management area 311 is updated to data 800b on Tuesday. The backup section 211 stores the differential data 700b in the area 321b in the SDV 320b for Tuesday corresponding to the management area 311 in the source volume 310. Here, the beginning of the SDV 320 stores the management information for an OS. Therefore, some locations of the areas 321 to store the differential data 700 may not allow the storage of the differential data from the beginning of the area 321. The area to store the differential data 700 is determined by software that manages the storage apparatus 20. However, the software designates the storage location for differential data without concern for the management of the backup information 400. Therefore, it may cause the differential data 400 to be stored off the beginning of the SDV 320. Because of this, the differential data 700b may sometimes not be stored at the beginning of the area 321b but at the position off the beginning.

Then, as illustrated in FIG. 11C, in order to restore the state of the source volume 310 to the Monday's state on Tuesday, the update information creating section 212 first creates Monday's update information 500a and Tuesday's update information 500b. At that time, the area for the Tuesday SDV 320b is delimited in accordance with the delimitation of the area for the SDV 320a of the oldest generation (which is Monday here). Then, an extracting section 213 extracts differential data 700a and 700b on the basis of the update information 500a and 500b.

Here, as illustrated in FIG. 12A, because the differential data 700a is stored from the beginning of the area 530a in the Monday SDV 320a, the entire data fits within the area 530a. Therefore, the extracting section 213 can extract the differential data 700a entirely. On the other hand, as illustrated in FIG. 12B, the differential data 700b is stored at a position off the area 510b in the Tuesday SDV 320b and belongs to not only the area 510b but also the adjacent area 520b. However, because the extracting section 213 only extracts the data stored in the area 510b the value of which is "1", the data belonging to the area 520b in the differential data 700b is not extracted.

Therefore, in such a case, the restored source volume 310 has omission of copy in an unextracted part 650 in differential data 700b in the management area 311, as illustrated in FIG. 13.

Figure 14:
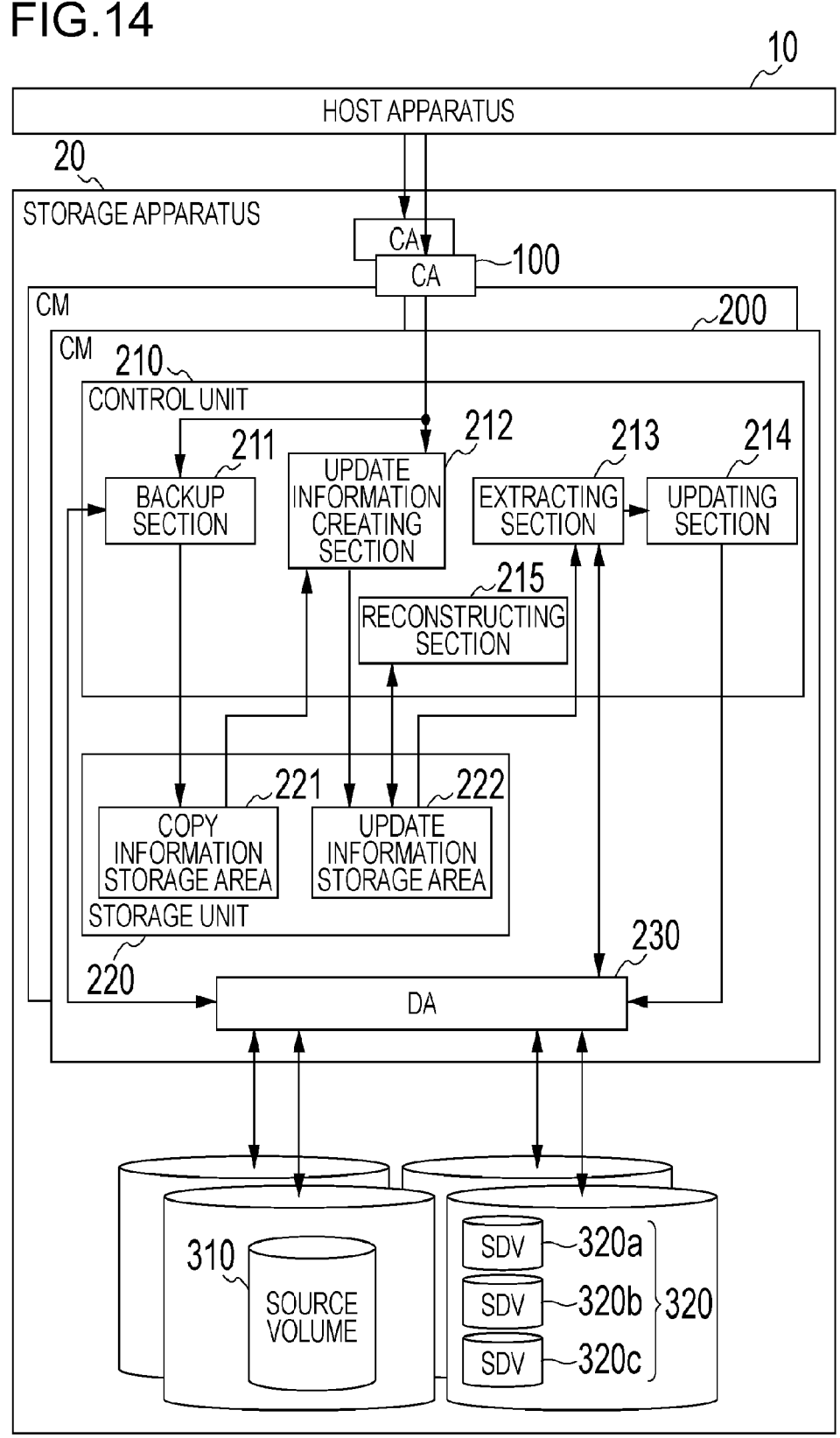
FIG. 14 is a block diagram for describing the configuration of a storage apparatus according to second embodiment.
Figure 15:
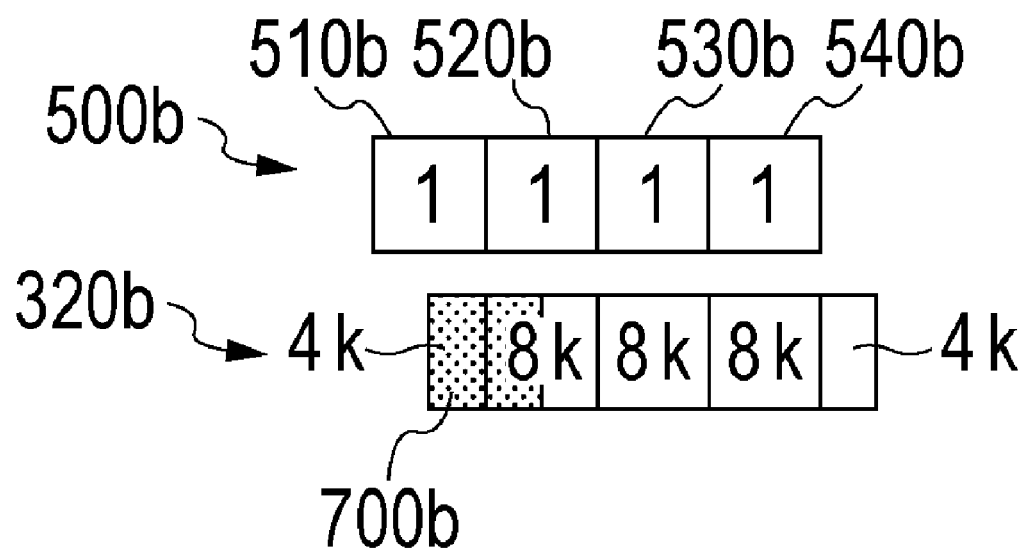
FIG. 15 is a diagram illustrating an example of the update information reconstructing method according to second embodiment.

Accordingly, the storage apparatus 20 according to this embodiment includes a reconstructing section 215 for preventing such omission of copy. The configuration of the storage apparatus 20 according to this embodiment will be described with reference to drawings below. FIG. 14 is a block diagram for describing the configuration of the storage apparatus according to the second embodiment and FIG. 15 is a diagram illustrating an example of the update information reconstructing method according to the second embodiment. The same reference numerals are given to the same components in the configuration described above, and the description thereon will be omitted herein.

As illustrated in FIG. 14, the storage apparatus 20 according to second embodiment includes a reconstructing section 215 in the control unit 210. The reconstructing section 215 functions as reconstructing means and reconstructs the update information from the restore generation to the latest generation such that it can indicate that the data has been updated in all of the management areas 311 to 314 in the source volume 310.

More specifically, as illustrated in FIG. 15, the reconstructing section 215 reconstructs all of the values in the areas 510b to 540b in the Tuesday's update information 500b to "1". Thus, in the Tuesday's SDV 320, even when the differential data 700b is stored at a position off the area 510b, the extracting section 213 can extract the data in the area 520b excluding the area 510b.

As described above, with the storage apparatus 2 and restoration method according to second embodiment, the omission of copy can be prevented in the restored source volume 310.

Third Embodiment

According to the second embodiment, the reconstructing section 215 reconstructs the values of all areas in the update information 500 to "1" to prevent the omission of copy in the restored source volume 310. However, when the values of all areas in the update information 500 are reconstructed to "1", it is difficult to identify an area which has not been updated from the restore generation on the basis of the OR information 600. As a result, more time may possibly be required for the restore processing.

Figure 16:
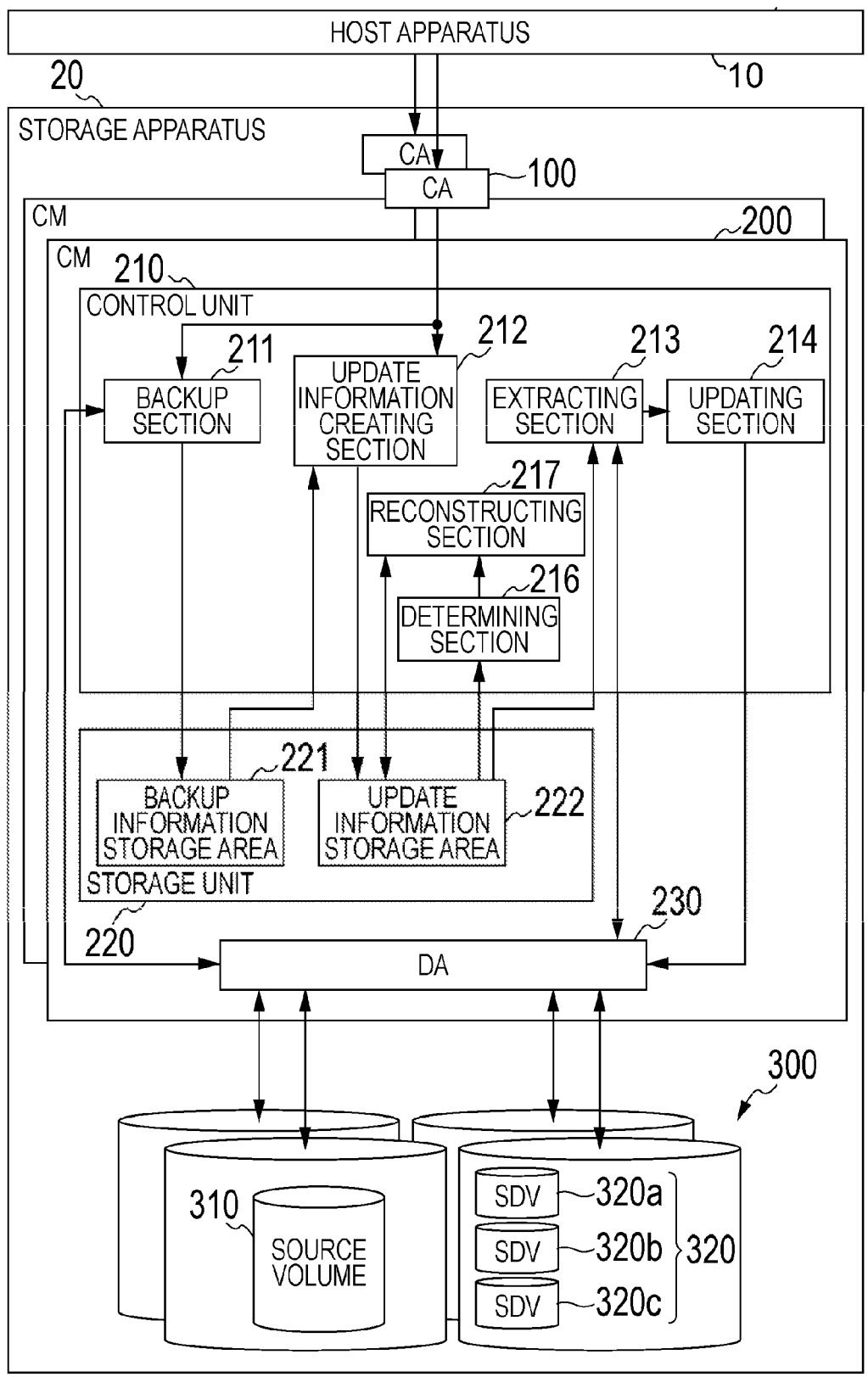
FIG. 16 is a block diagram for describing the configuration of the storage apparatus according to third embodiment.
Figure 17:
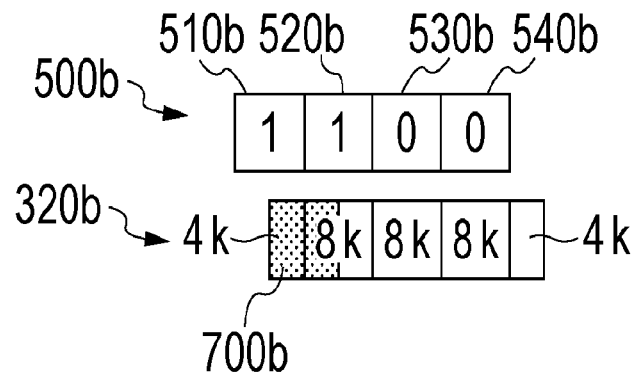
FIG. 17 is a diagram illustrating an example of the update information reconstructing method according to third embodiment.

Accordingly, according to third embodiment, a determining section is provided to only reconstruct the value of a necessary area in the areas in the SDV 320. The configuration of a storage apparatus 20 according to third embodiment will be described with reference to drawings below. FIG. 16 is a block diagram for describing the configuration of the storage apparatus according to the third embodiment, and FIG. 17 is a diagram illustrating an example of the update information reconstructing method according to the third embodiment. Notably, the same reference numerals are given to the same components as those in the configuration described above, and the description thereon will be omitted herein.

As illustrated in FIG. 16, the storage apparatus 20 according to the third embodiment further includes a determining section 216 and a reconstructing section 217 in the control unit 210. The determining section 216 functions as determining process and determines which of the management areas 311 to 313 in the source volume 310 corresponds to the area in the backup SDV 320 storing the differential data stored in the SDV 320 from the restore generation to the latest generation. The reconstructing section 217 functions as reconstructing process and reconstructs the update information 500 from the restore generation to the latest generation to indicate that the data has been updated in the management area in the source volume 310 corresponding to the area, which is determined by the determining section 216, in the SDV 320 corresponding to the update information 500.

More specifically, the determining section 216 determines whether any difference exists between the SLBA of differential data and the first LBA in the area to which the SLBA belongs in the SDV 320. For example, it is assumed as illustrated in FIG. 10 that data I stored in the management area 313 in the source volume 310 is stored in the areas from an SLBA=40 to an LBA=56 in the Tuesday SDV 320b. In this case, the determining section 216 calculates (SLBA−LBA=8, (SLBA-LBA) will be called extBound hereinafter), which is the difference between the first LBA=32 in the area (including the areas from the LBA=32 to LBA=48) to which the SLBA of the differential data I belongs and the SLBA=40 in SDV 320b.

Here, if the calculated extBound is 0, the determining section 216 determines that the differential data is only stored within the area to which the SLBA of the differential data belongs. On the other hand, if the calculated extBound is not 0, the determining section 216 determines that the differential data is stored in the area to which the SLBA of the differential data belongs and the area subsequent to the area. Therefore, in the case illustrated in FIG. 12B, the determining section 216 determines that the differential data 700b is stored in the areas 510b and 520b.

Then, the reconstructing section 217 reconstructs the values in the areas 510b and 520b, which are determined by the determining section 216, in the areas 510b to 540b in the update information 500b for Tuesday to "1", as illustrated in FIG. 17. Thus, even when the differential data 700b is stored at the position off the area 510b in the Tuesday SDV 320, the extracting section 213 can extract the data in the area 520b in addition to the data in the area 510b.

As described above, with the storage apparatus 20 and restoration method according to the third embodiment, the omission of copy in the restored source volume 310 can be prevented. Furthermore, the calculation of OR of update information by determining an area requiring the reconstruction by the determining section 216 allows the identification of the area which has not been updated from the restore generation in the source volume 310. Thus, the increase in time required for the restore processing can be prevented.

Figure 18:
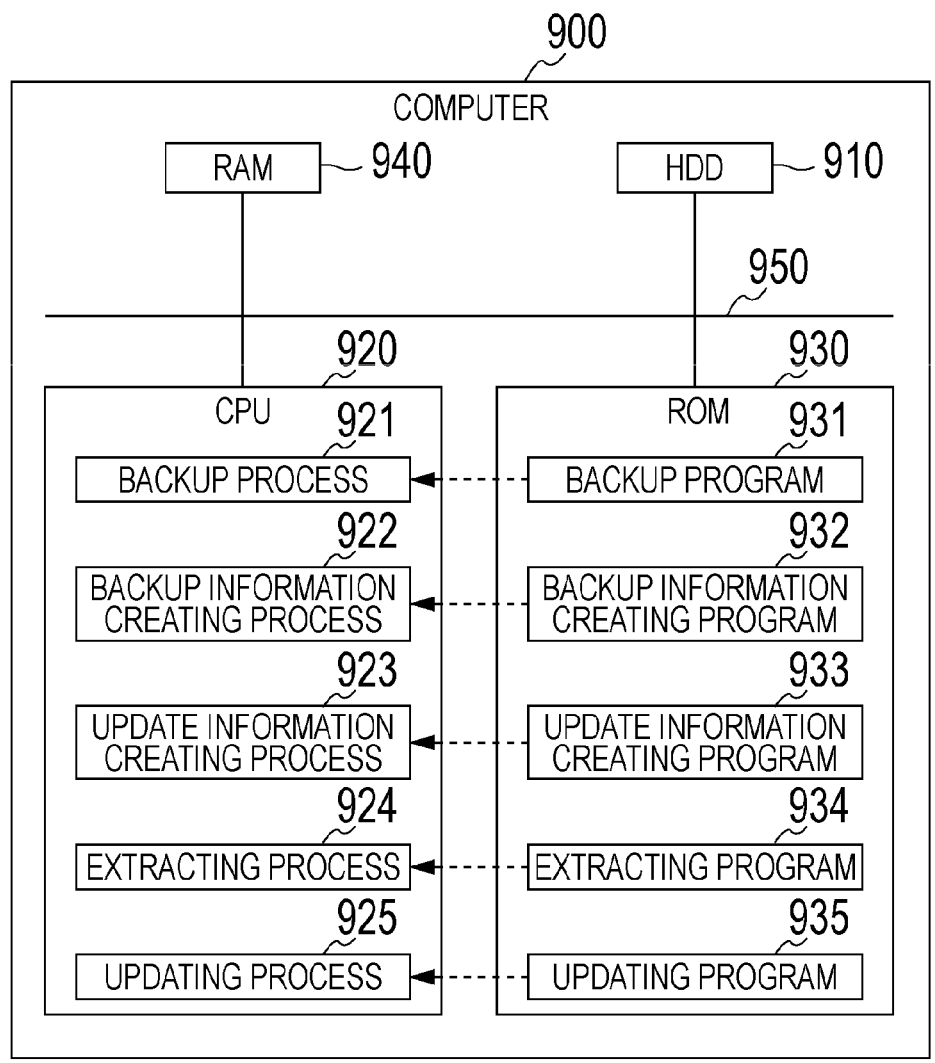
FIG. 18 is a diagram illustrating a computer that executes a restoration program.
Figure 19:
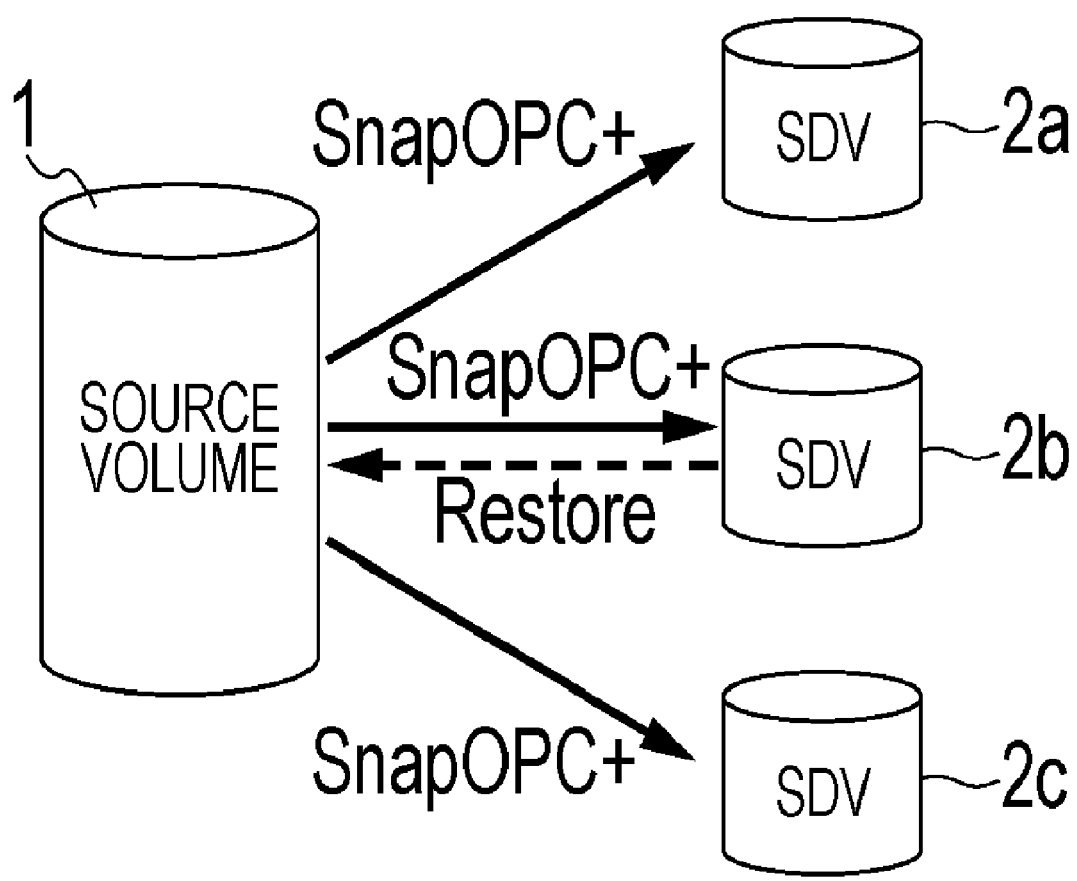
FIG. 19 is a diagram illustrating how backup date is created for each generation with SnapOPC+ according to a related art.

By the way, the processing having described according to the embodiments may be implemented by executing a prepared program by a computer. Now, with reference to FIG. 18, an example of the computer that executes a restoration program having the same function as that of storage apparatus 20 according to the embodiments will be described below. FIG. 18 is a diagram illustrating a computer that executes a restoration program.

As illustrated in FIG. 18, a computer 900 functioning as the storage apparatus 20 includes an HDD 910, a CPU 920, a ROM 930 and a RAM 940, which are connected via a bus 950.

The ROM 930 prestores a restoration program exerting the same function as the embodiments, that is, as illustrated in FIG. 18, a backup program 931, a backup information creating program 932, an update information creating program 933, an extracting program 934 and an update program 935.

The CPU 920 reads and executes the programs 931 to 935 from the ROM 930, whereby the programs 931 to 935 can function as a backup process 921, a backup information creating process 922, an update information creating process 923, an extracting process 924 and an updating process 925. In this way, the CPU 920 can be equivalent to the control unit 210 illustrated in FIG. 2.

Notably, the HDD 910 stores data to be used by the processes 921 to 925. The CPU 920 reads data stored in the HDD 910 and stores it to the RAM 940. The processes 921 to 925 use the data stored in the RAM 940 to perform processing such as the update information creating processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage apparatus, comprising:
a source volume configured to store data being read and written by a host, the data being stored in each of management areas allocated to the source volume;
a backup volume for backing up data before update in each of the management areas allocated to the source volume in each generation; and
a processor configured to control the storage apparatus according to a process including:
backing up the data before update into the backup volume corresponding to a current generation, upon the data of the source volume being updated from an immediately preceding generation on the current generation;
creating, in each of the management areas, backup information indicating whether the data is backed up, upon the data being backed up in each generation;
receiving a restore execution instruction from the host;
creating, in each of the management areas in response to the restore execution instruction, update information indicating whether the data in each of the management areas is updated from a restore generation to be restored to the latest generation, on the basis of the backup information in each generation;
calculating a logical add of the update information in each generation from the restore generation to be restored to the latest generation in each of the management areas allocated to the source volume;
creating logical add information indicating whether the data in each of the management areas allocated to the source volume is at least updated in one generation from among the restore generation to be restored to the latest generation;
not extracting the data in one of the management areas for the restore generation, when the logical add information in each of the management areas indicates that the data in a corresponding area of the management areas is not updated in all generations from the restore generation to be restored to the latest generation;
extracting the data before update stored in the backup volume of the oldest generation as the data of the restore generation on the basis of the update information for the oldest generation in each of the management areas, when the logical add information in each of the management areas indicates that the data in the corresponding area of the management areas is at least updated in one generation from among the restore generation to be restored to the latest generation; and
updating the current data stored in the same management areas as the management areas in which the data before update was stored, by the data before update extracted by the extracting process.

2. The storage apparatus according to claim 1, wherein the extracting process determines whether the update information indicates that the data in each of the management areas is updated in order from the update information of an older generation from the restore generation to the latest generation.

3. The storage apparatus according to claim 1, further comprising,
reconstructing the update information to indicate that the data in all of the management areas of the source volume is updated.

4. The storage apparatus according to claim 1, further comprising,
determining which of the management areas of the source volume corresponds to the area in the backup volume storing the data before update,
the data before update being stored in the backup volume of each generation from the restore generation to the latest generation; and
reconstructing the update information corresponding to the area determined by the determining process.

5. A data restoring method in a storage apparatus, the storage apparatus having a source volume for storing data being read and written by a host and a backup volume for backing up data before update in each of management areas allocated to the source volume in each generation, the method comprising:
backing up the data before update into the backup volume corresponding to current generation, upon the data of the source volume being updated from immediately preceding generation on the current generation;
creating, in each of the management areas, backup information indicating whether the data is backed up, upon the data being backed up in each generation;
receiving a restore execution instruction from the host;
creating, in each of the management areas in response to the restore execution instruction, update information indicating whether the data in each of the management areas is updated from restore generation to be restored to the latest generation, on the basis of the backup information in each generation;
calculating a logical add of the update information in each generation from the restore generation to be restored to the latest generation in each of the management areas allocated to the source volume;

creating logical add information indicating whether the data in each of the management areas allocated to the source volume is at least updated in one generation from among the restore generation to be restored to the latest generation;

not extracting the data in one of the management areas for the restore generations, when the logical add information in each of the management areas indicates that the data in a corresponding area of the management areas is not updated in all generations from the restore generation to be restored to the latest generation;

extracting the data before update stored in the backup volume of the oldest generation as the data of the restore generation on the basis of the update information for the oldest generation in each of the management areas, when the logical add information in each of the management areas indicates that the data in the corresponding area of the management areas is at least updated in one generation from among the restore generation to be restored to the latest generation; and updating the current data stored in the same management areas as the management areas in which the data before update was stored, by the data before update extracted by the extracting step.

6. The method according to claim 5, wherein the extracting step determines whether the update information indicates that the data in each of the management areas is updated in order from the update information of an older generation from the restore generation to the latest generation.

7. The method according to claim 5, further comprising,
reconstructing the update information to indicate that the data in all of the management areas of the source volume is updated.

8. The method according to claim 5, further comprising,
determining which of the management areas of the source volume corresponds to the area in the backup volume storing the data before update, the data before update being stored in the backup volume of each generation from the restore generation to the latest generation; and reconstructing the update information corresponding to the area determined by the determining process.

* * * * *